US011477939B2

(12) United States Patent
Zeiler et al.

(10) Patent No.: US 11,477,939 B2
(45) Date of Patent: Oct. 25, 2022

(54) MOWER DECK INSERT

(71) Applicant: Briggs & Stratton, LLC, Wauwatosa, WI (US)

(72) Inventors: Jeffrey M. Zeiler, Pewaukee, WI (US); Kenneth W. Derra, New Berlin, WI (US); Scott A. Funke, New Berlin, WI (US); David W. Procknow, Elm Grove, WI (US); Rodney J. Balzar, West Bend, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 257 days.

(21) Appl. No.: 16/798,272

(22) Filed: Feb. 21, 2020

(65) Prior Publication Data
US 2020/0205339 A1 Jul. 2, 2020

Related U.S. Application Data

(63) Continuation of application No. 15/430,304, filed on Feb. 10, 2017, now abandoned, which is a
(Continued)

(51) Int. Cl.
*A01D 34/81* (2006.01)
*A01D 34/00* (2006.01)
(Continued)

(52) U.S. Cl.
CPC ........... *A01D 34/81* (2013.01); *A01D 34/005* (2013.01); *A01D 34/664* (2013.01);
(Continued)

(58) Field of Classification Search
CPC .... A01D 34/81; A01D 34/005; A01D 34/664; A01D 34/667; A01D 34/71; A01D 34/823; A01D 34/73
See application file for complete search history.

(56) References Cited

U.S. PATENT DOCUMENTS 3,646,739 A * 3/1972 Dahl .................... A01D 34/828
56/320.1
4,189,903 A 2/1980 Jackson et al.
(Continued)

FOREIGN PATENT DOCUMENTS

JP 06-038609 A 2/1994
WO WO-1991/06204 5/1991

OTHER PUBLICATIONS

International Search Report and Written Opinion, PCT/US2015/044730, Briggs & Stratton Corporation (dated Oct. 27, 2015).

*Primary Examiner* — Abigail A Risic
(74) *Attorney, Agent, or Firm* — Foley & Lardner LLP

(57) ABSTRACT

A mower deck insert includes a first cutting chamber, a second cutting chamber, and a discharge passage extending adjacent to the first cutting chamber and the second cutting chamber. The first cutting chamber includes a first axial scroll extending about a first vertical axis. The first axial scroll includes a first upper surface having a first start region and a first end region. The second cutting chamber includes a second axial scroll extending about a second vertical axis. The second axial scroll includes a second upper surface having a second start region and a second end region. The first start region is vertically lower than the first end region, and the second start region is vertically lower than the second end region.

20 Claims, 23 Drawing Sheets

Related U.S. Application Data continuation of application No. PCT/US2015/044730, filed on Aug. 11, 2015.

(60) Provisional application No. 62/035,606, filed on Aug. 11, 2014.

(51) Int. Cl.
*A01D 34/66* (2006.01)
*A01D 34/71* (2006.01)
*A01D 34/82* (2006.01)
*A01D 34/73* (2006.01)
*A01D 101/00* (2006.01)

(52) U.S. Cl.
CPC ........... *A01D 34/667* (2013.01); *A01D 34/71* (2013.01); *A01D 34/826* (2013.01); *A01D 34/73* (2013.01); *A01D 2101/00* (2013.01)

(56) References Cited

U.S. PATENT DOCUMENTS

| | | | |
|---|---|---|---|
| 4,312,421 A | 1/1982 | Pioch | |
| 4,326,370 A | 4/1982 | Thorud | |
| 4,361,000 A | 11/1982 | Friberg | |
| 4,887,420 A | 12/1989 | Cerny et al. | |
| 4,899,526 A | 2/1990 | Harris | |
| 5,064,315 A | 11/1991 | Samejima et al. | |
| 5,129,217 A | 7/1992 | Loehr | |
| 5,210,998 A | 5/1993 | Hojo et al. | |
| 5,212,938 A | 5/1993 | Zenner et al. | |
| 5,267,429 A * | 12/1993 | Kettler | A01D 34/005 56/320.2 |
| 5,465,564 A | 11/1995 | Koehn et al. | |
| 5,628,171 A | 5/1997 | Stewart et al. | |
| 5,638,668 A | 6/1997 | Kallevig et al. | |
| 5,765,346 A * | 6/1998 | Benter | A01D 34/005 56/2 |
| 5,884,466 A * | 3/1999 | Willmering | A01D 34/81 56/320.1 |
| 5,890,354 A | 4/1999 | Bednar | |
| 6,065,276 A | 5/2000 | Hohnl et al. | |
| 6,189,307 B1 | 2/2001 | Buss et al. | |
| 7,146,791 B2 | 12/2006 | Benway et al. | |
| 7,171,799 B2 | 2/2007 | Takeishi et al. | |
| 7,299,613 B2 * | 11/2007 | Samejima | A01D 34/005 56/6 |
| 7,555,887 B2 * | 7/2009 | Schick | A01D 34/71 56/320.1 |
| 7,665,286 B2 * | 2/2010 | Butler | A01D 34/005 56/320.1 |
| 7,685,799 B2 | 3/2010 | Samejima et al. | |
| 7,866,135 B2 | 1/2011 | Davis et al. | |
| 7,980,049 B1 | 7/2011 | Branham et al. | |
| 8,156,722 B2 * | 4/2012 | Sugio | A01D 34/81 56/320.1 |
| 8,196,382 B2 | 6/2012 | Foster, III | |
| 9,930,831 B2 * | 4/2018 | Swan | A01D 34/71 |
| 10,524,418 B1 * | 1/2020 | Wright | A01D 34/005 |
| 2004/0237492 A1 * | 12/2004 | Samejima | A01D 34/005 56/320.1 |
| 2004/0255567 A1 | 12/2004 | Kallevig et al. | |
| 2005/0109002 A1 | 5/2005 | Peter et al. | |
| 2007/0062169 A1 | 3/2007 | Busboom et al. | |
| 2009/0064650 A1 | 3/2009 | Eberle et al. | |
| 2009/0077941 A1 * | 3/2009 | Huisman | A01D 34/71 56/320.2 |
| 2010/0083630 A1 | 4/2010 | Ahlund et al. | |
| 2015/0013298 A1 | 1/2015 | Gaeddert et al. | |
| 2015/0047310 A1 | 2/2015 | Schreiner | |
| 2020/0077603 A1 * | 3/2020 | Hoppel | A01D 42/06 |

* cited by examiner

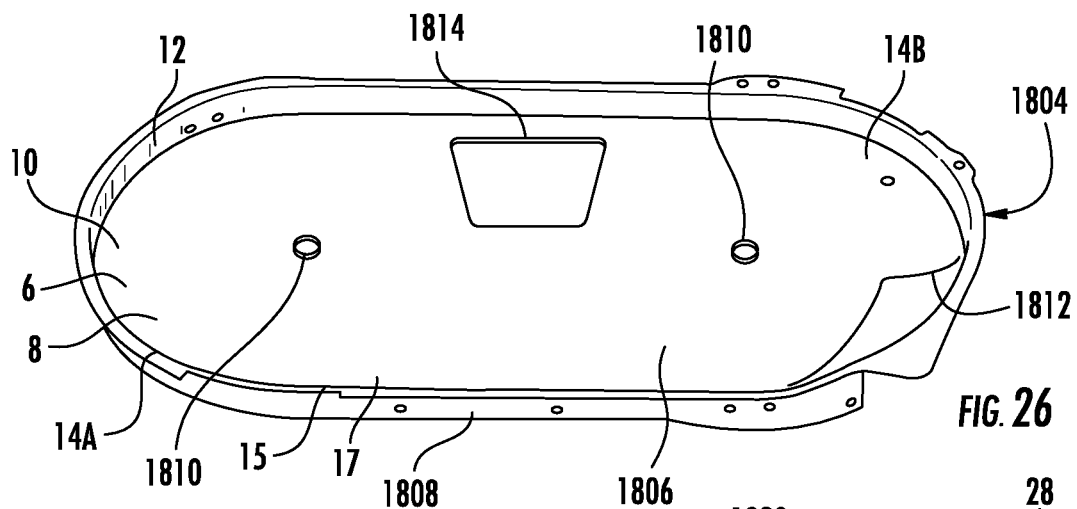
FIG. 26
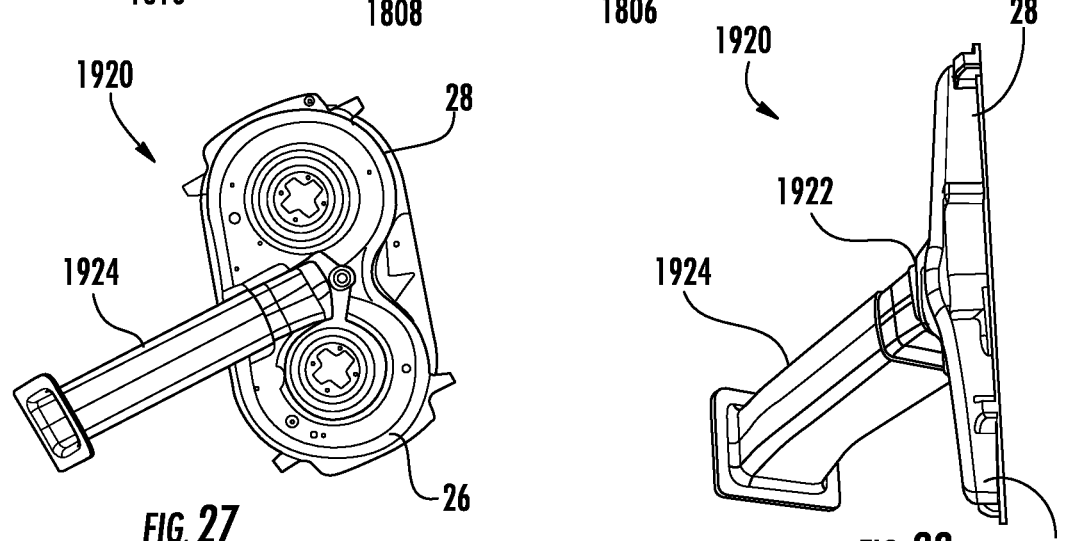
FIG. 27
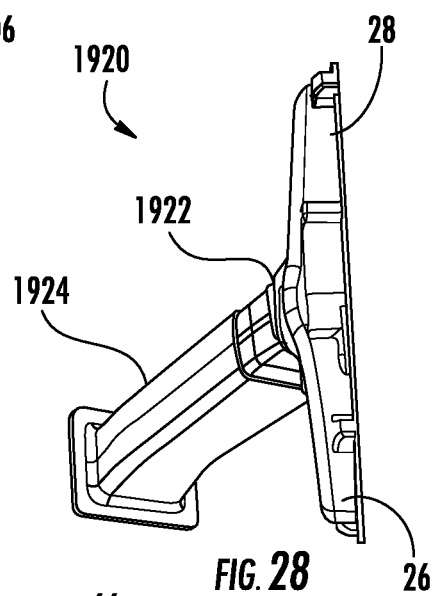
FIG. 28
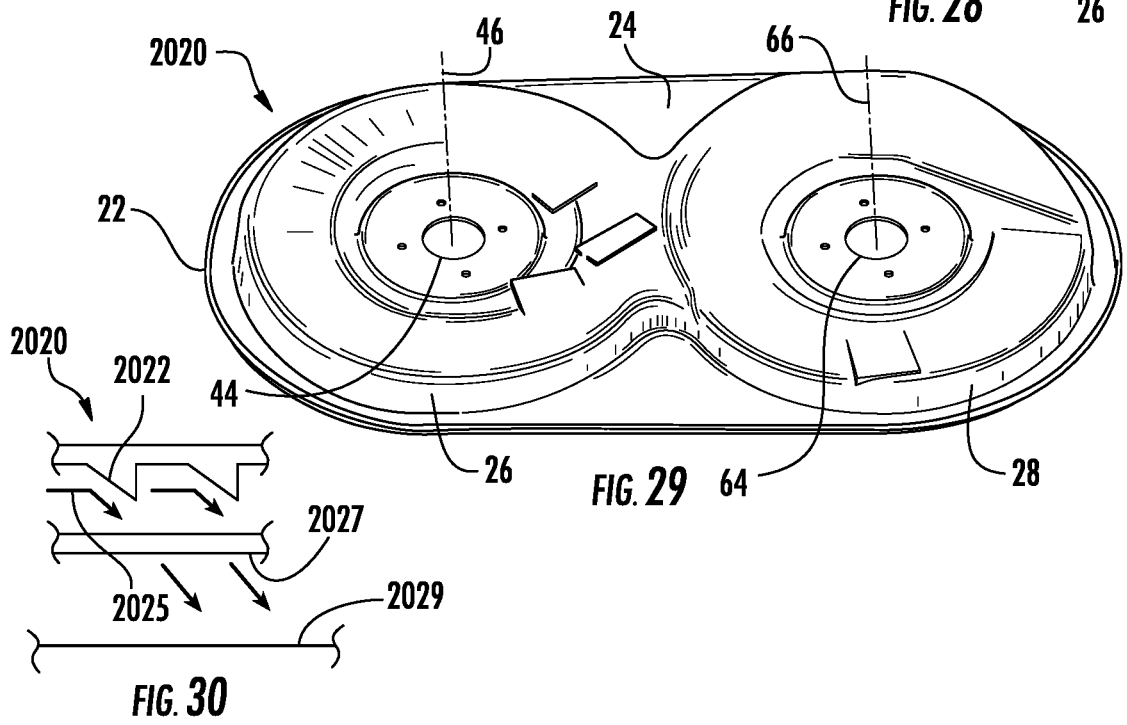
FIG. 29
FIG. 30

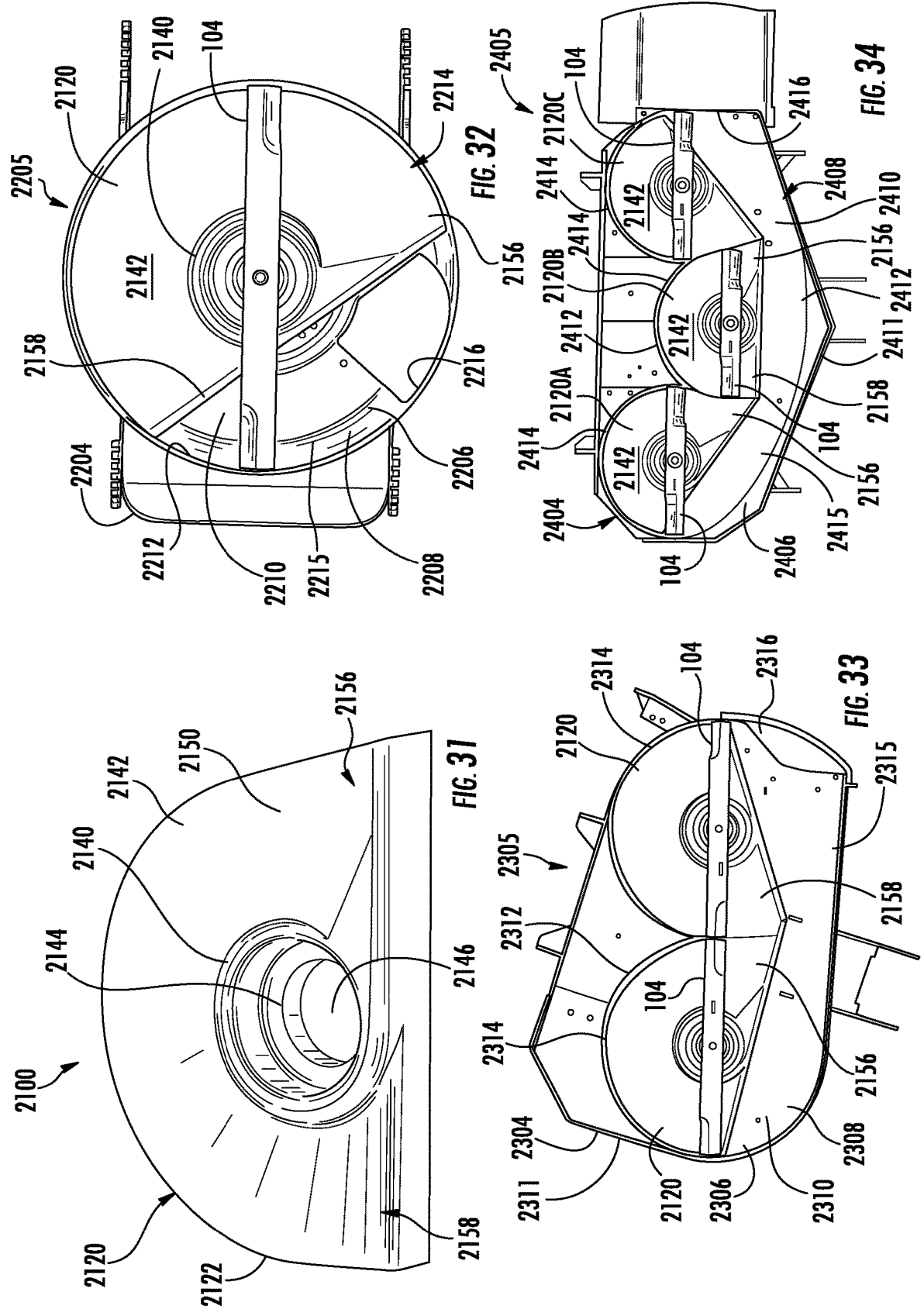

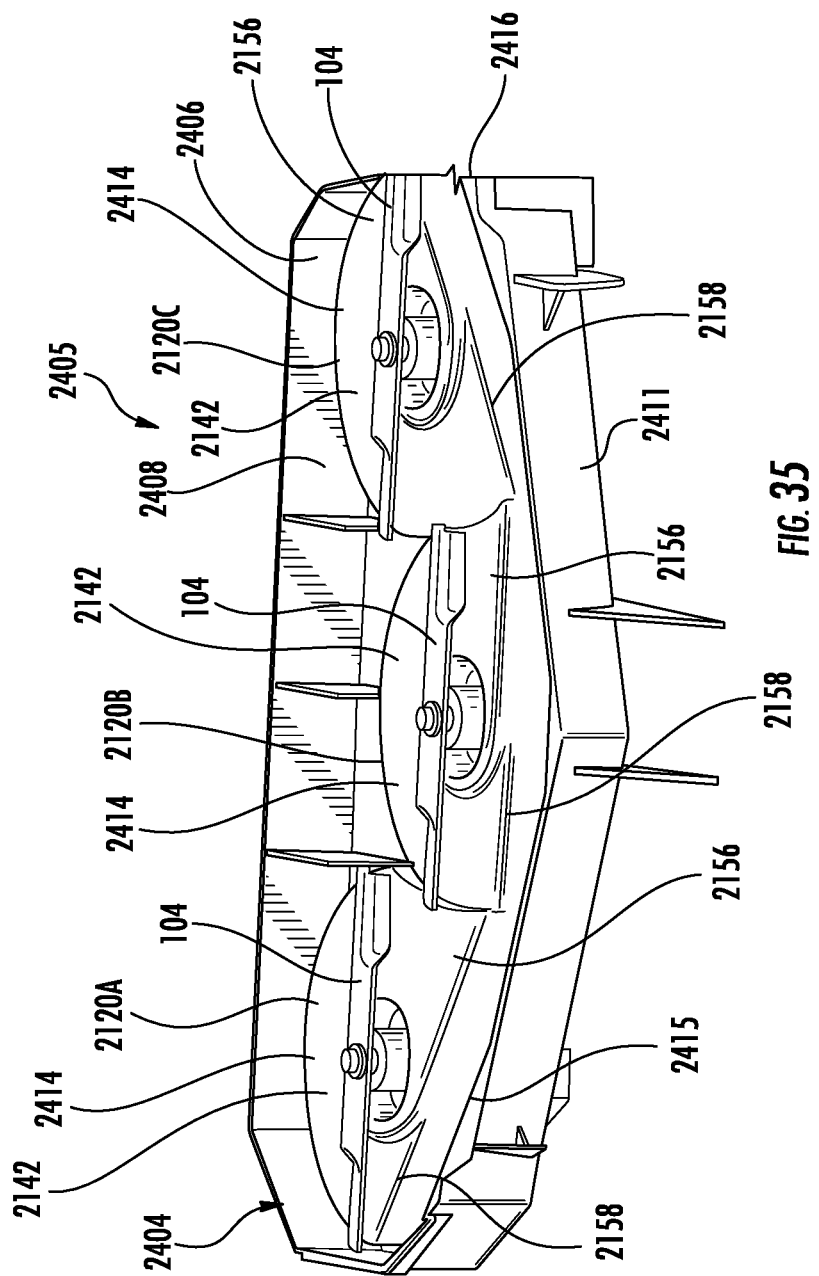

MOWER DECK INSERT

CROSS-REFERENCE TO RELATED PATENT APPLICATIONS

This application is a continuation of U.S. application Ser. No. 15/430,304, filed Feb. 10, 2017, which is a continuation of PCT/US2015/044730, filed Aug. 11, 2015, which claims priority to U.S. Provisional Application No. 62/035,606, filed on Aug. 11, 2014, all of which are incorporated herein by reference in their entireties.

BACKGROUND

Mowers typically include one or more rotating blades and a deck which covers the rotating blades. Mower decks and blades that produce enough air flow for good quality of cut are often noisy and inefficient and require a lot of power to drive the blades.

SUMMARY

A first embodiment of the invention relates to a mower deck insert including a first cutting chamber, a second cutting chamber, and a discharge passage extending adjacent to the first cutting chamber and the second cutting chamber. The first cutting chamber includes a first axial scroll extending about a first vertical axis. The first axial scroll includes a first upper surface having a first start region and a first end region. The second cutting chamber includes a second axial scroll extending about a second vertical axis. The second axial scroll includes a second upper surface having a second start region and a second end region. The first start region is vertically lower than the first end region, and the second start region is vertically lower than the second end region.

Another embodiment of the invention relates to a mower including at least one cutting blade operable to rotate about a vertical axis, a mower deck, a mower deck insert coupled to the mower deck. The mower deck insert includes at least one cutting chamber including an axial scroll helically extending about the vertical cutting axis. The axial scroll includes an upper surface having a start region and an end region. The start region is vertically lower than the end region.

Another embodiment of the invention relates to a mower including a mower deck, a first cutting blade operable to rotate about a first vertical axis, a second cutting blade operable to rotate about a second vertical axis, and a mower deck insert coupled to the mower deck. The mower deck insert includes a first cutting chamber and a second cutting chamber. The first cutting chamber includes a first axial scroll helically extending about the first vertical cutting axis, the first axial scroll including a first upper surface having a first start region and a first end region. The second cutting chamber includes a second axial scroll helically extending about the second vertical cutting axis, the second axial scroll including a second upper surface having a second start region and a second end region. The first end region is approximately 240° about the first vertical axis from the first start region.

BRIEF DESCRIPTION OF THE DRAWINGS

FIG. 26 is a bottom perspective view of an example deck.

FIG. 27 is a top view of another example deck insert for use with the deck of FIG. 26 for rear bagging.

FIG. 28 is a front perspective view of the deck insert of FIG. 27.

FIG. 29 is a top view of another example deck insert for mulching.

FIG. 30 is a sectional view of a portion of the deck insert of FIG. 29.

FIG. 31 is a bottom view of an example deck insert module.

FIG. 32 is a bottom view of an example deck assembly comprising the module of FIG. 31 mounted beneath example deck.

FIG. 33 is a bottom view of another example deck assembly comprising a pair of the modules of FIG. 31 mounted beneath another example deck.

FIG. 34 is a bottom view of another example deck assembly comprising three of the modules FIG. 31 beneath another example deck.

FIG. 35 is a bottom perspective of the deck assembly of FIG. 34.

DETAILED DESCRIPTION OF EXAMPLES

Figure 1:
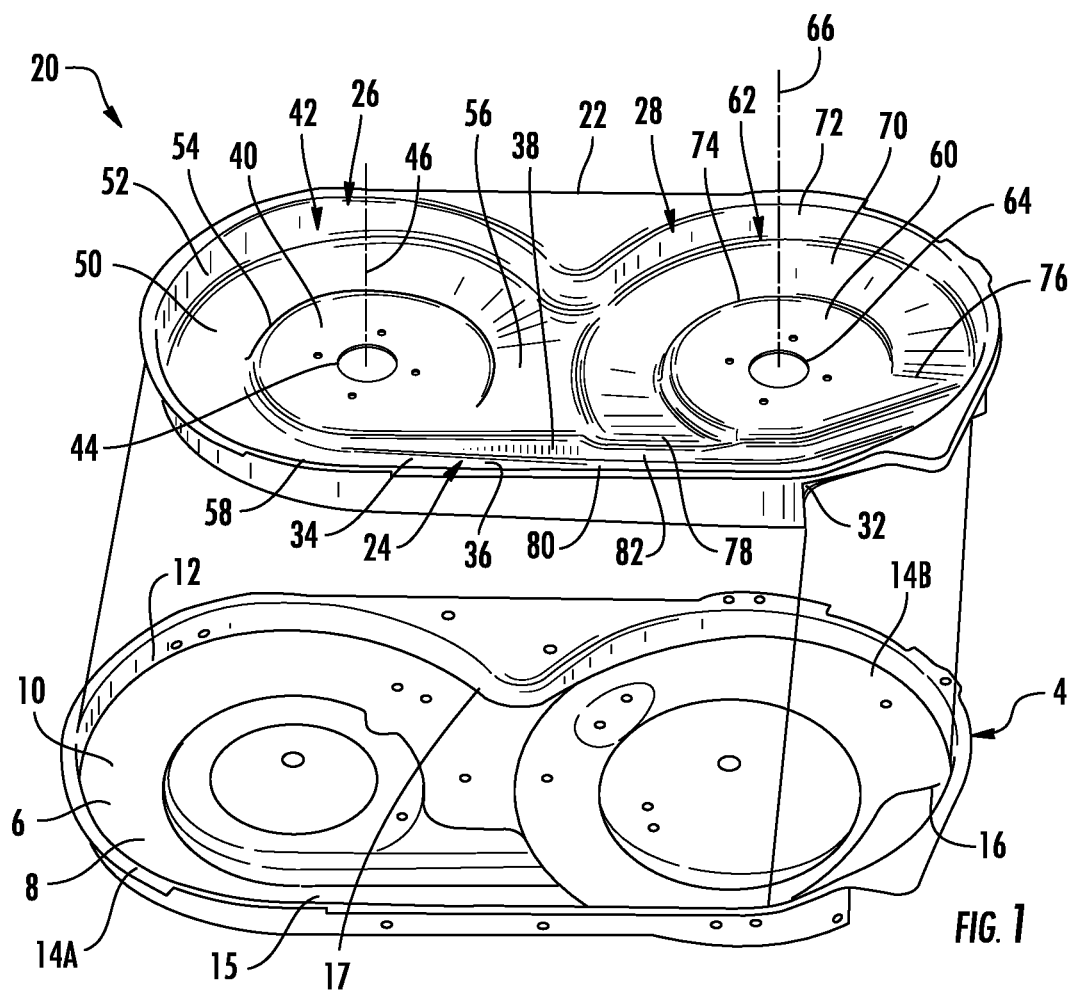
FIG. 1 is an exploded perspective view of an example mower deck and a deck insert in an inverted orientation.
Figure 2:
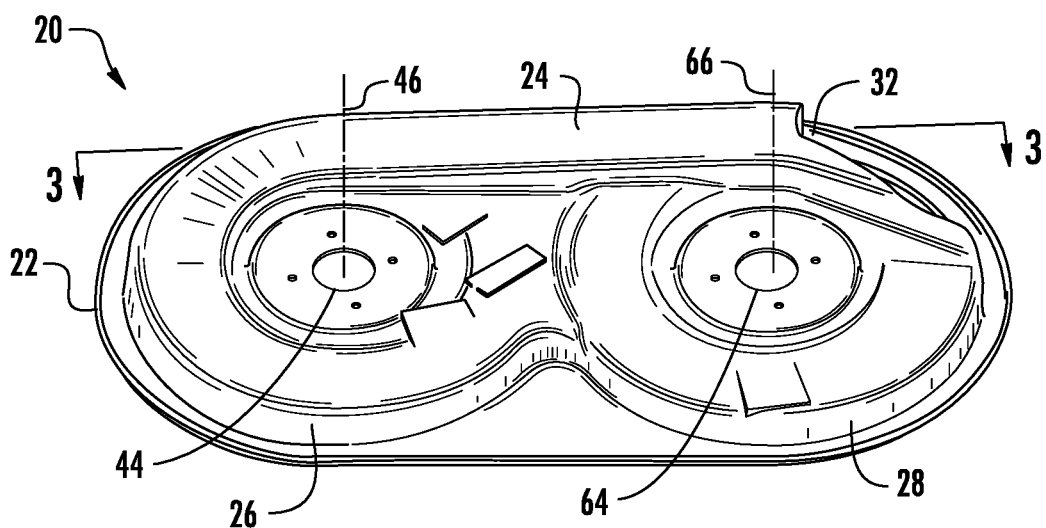
FIG. 2 is a perspective view of the deck insert of FIG. 1 in an upright orientation.

FIGS. 1 and 2 illustrate an example mower deck insert 20. FIG. 1 illustrates an underside of mower deck insert 20 withdrawn from mower deck 4 while FIG. 2 illustrates the upright operational orientation of mower deck insert 20 removed from mower deck 4. Mower deck insert 20 is configured to be removably mounted to and held or retained within mower deck 4 so as to surround rotating blades. In other implementations, mower deck insert 20 is permanently mounted or fixed within mower deck 4. In one implementation, mower deck 4 and mower deck insert 20 are for use on a riding mower. In another implementation, mower deck 4 and mower deck insert 20 are for use on a walk-behind self-propelled or push mower. In yet another implementation, mower deck 4 and mower deck insert 20 are for use on a zero turn radius (ZTR) mower. In yet another implementation, mower deck 4 and mower deck insert 20 are for use on a wide area walking mower. As will be described hereafter, mower deck insert 20 protects the underside of mower deck 4 and additionally provides mower deck 4 with a different interior profile that offers greater or equal airflow with less noise and improved efficiency (i.e. less power required to drive the blades). In one implementation, mower deck insert 20 has an interior profile different than the interior profile of the original mower deck, wherein mower deck insert 20 is specifically shaped to optimize side discharge, mulching, or bagging performance. In another implementation, the mower deck insert 20 is specifically shaped to optimize mowing performance in atypical mowing conditions caused by grass type, density, length and moisture content as well as, climate and seasonal changes (e.g. fall leaf cleanup).

Mower deck 4 comprises a deck for being mounted beneath a chassis of a tractor unit so as to enclose a pair of rotating cutting blades. Mower deck 4 has an underside cavity 6 with an interior profile 8. For purposes of this disclosure, the phrase "interior profile" refers to the shape and proportionate size of the interior surfaces that direct airflow produced by the rotation of the cutting blades. In the example illustrated, mower deck 4 comprises a ceiling 10 and sidewalls 12 that form two side-by-side cutting chambers 14A, 14B (collectively referred to as chambers 14), a discharge passage 15 extending alongside cutting chamber 14A and a discharge opening 16 through which cut grass is discharged from chambers 14. Unfortunately, the interior profile of deck 4 may not promote efficient airflow, optimize mowing performance, or reduce noise.

Mower deck insert 20 comprises an additional structure and is either removably or permanently mounted to the underside of deck 4, wherein the structure has an interior profile different than the interior profile of deck 4. In one implementation, mower deck insert 20 is mounted to the underside of deck 4 using mechanical attachment with fasteners, such as screws, bolts, clips, "Christmas trees" and the like, or various fittings. In another implementation, mower deck insert 20 is mounted to the underside of mower deck 4 using a multitude of bonding processes including adhesives and coatings. In yet another implementation, mower deck insert 20 is mounted to the underside of mower deck 4 through welding, latches or other securement mechanism.

In one implementation, mower deck insert 20 is formed from one or more polymeric materials or plastics, providing mower deck insert 20 with flexibility and enabling mower deck insert 20 to bend or flex to fit to an existing mower deck 4 without substantially increasing the weight of the cutting unit of the mower. Polymeric forming processes for the mower deck insert 20 could include thermoforming, injection molding, blow molding, rotational molding, and polystyrene foam (or alternative functional equivalent material) coated with a polymeric material. In other implementations, mower deck insert 20 is formed from fiberglass or a stamped metal, such as steel or aluminum. A stamped metal deck insert may be coated or treated with a chemical compound (such as boron nitride) to provide wear resistance and/or reduced friction/anti-stick properties. In yet other implementations, mower deck insert 20 is formed from a foam material or an alternative functional equivalent material (such as wood), wherein at least the underside of the material is coated with a wear resistant coating and/or a low friction/anti-stick coating, such as polytetrafluoroethylene (TEFLON), boron nitride, or polyuria/polyurethane. In addition to providing wear resistance and/or low friction, the coating may also be used to bond the mower deck insert 20 to the mower deck 4.

In some implementations, deck insert 20 may be employed permanently to the mower deck. In some implementations, deck insert 20 is removably mountable to mower deck 4, facilitating easy replacement of deck insert 20 when deck insert 20 becomes worn or damaged or when a different interior profile is preferred to optimize performance for a specific application need, such as side-discharging, bagging, mulching, or atypical mowing conditions. Differently configured cutting blades can be used with different interior profiles to provide optimal airflow and/or reduced noise characteristics and/or reduced power consumption characteristics, for a specific application need. A reduced power consumption characteristic is especially desirable if the blade drive system is a battery-powered electric motor. Because deck insert 20 extends on the inside of deck 4, deck insert 20 protects deck 4 which now serves as a backing, substrate or base structure. In some implementations, sound insulating material can be used between deck insert 20 and deck 4. Deck insert 20 being of favorable shape for enhanced airflow with less drag and turbulence, reduces unwanted grass buildup on the underside of the mower deck, usually experienced when cutting wet grass. This effect can be enhanced via use of reduced friction/anti-stick coatings in combination with the favorable deck insert 20 shape. Deck insert 20 being of favorable shape for enhanced airflow and vacuum generation reduces or eliminates blow-out from underneath the deck lip, thus improving cut-quality of the mowing unit.

In the example illustrated, mower deck insert 20 comprises a panel or body 22 forming or providing discharge passage 24, far side cutting chamber 26 and nearside cutting chamber 28. Discharge passage 24 comprises an elongated channel formed on an underside of body 22 and having a ceiling 34 (appearing as a floor in the inverted mower deck illustrating FIG. 1) bound on opposite sides by sidewalls 36, 38. Discharge passage 24 extends tangent to chambers 26, 30 and terminates at a discharge opening 32. Discharge passage 24 receives airflow generated by rotating blades within each of chambers 26, 28, along with cut grass and other materials. Discharge passage 24 directs the airflow and the cut material through and out discharge opening 32. In one implementation, discharge opening 32 disperses grass clippings and other cut material. In another implementation of discharge opening 32 directs the grass clippings and other cut material into a collection volume such as a mower bag.

In the example illustrated in which cut vegetation is dispersed through discharge opening 32, discharge opening 32 circumferentially extends about axis 72 by at least 75 degrees to discharge the increased rate at which air and cut vegetation are driven by the cutting unit including deck insert 20.

Far side cutting chamber 26 comprises a cavity formed on the underside of body 22 for receiving and shielding the far side cutting blade (not shown). Far side cutting chamber 26 comprises hub 40 and axial scroll 42. Hub 40 comprises a portion of body 22 centrally located within chamber 26 and providing a blade mounting portion 44 to rotatably support the far side cutting blade for rotation about far side axis 46. In the example illustrated, blade mounting portion 44 comprises an aperture extending through hub 40 of body 22 through which a blade shaft or blade bearing assembly extends.

Axial scroll 42 comprises a channel helically extending about axis 46. Axial scroll 42 comprises an upper surface 50 (appearing as a floor in the inverted deck of FIG. 1) bound by sidewalls 52, 54. Upper surface 50 axially scrolls about axis 46 such that scroll 42 is shallowest and such that upper surface 50 is vertically lowest at start region 56 of scroll 42 and such that scroll 42 is the deepest and vertically highest at end region 58, the junction between scroll 42 and discharge passage 24. In the example illustrated, upper surface 50 smoothly blends with or ramps into ceiling 34 of discharge passage 24 at end region 58. In other implementations, the junction between upper surface 50 and region 58 and discharge passage 24 may have a distinctive ramp or step.

In the example illustrated, scroll 42 extends at least 180° and nominally 240° about axis 46. Upper surface 50 of scroll 42 has scroll height change of less than 2 inches from start region 56 to end region 58. With such an example, a sufficiently large amount of airflow is produced to move grass clippings and other cut material while at the same time maintaining a low profile for the deck insert 20, allowing deck insert 20 to better fit beneath a mower chassis. In other implementations, scroll 42 may scroll about axis 46 by other extents and have a different scrolling rate with a different height change.

Near side cutting chamber 28 comprises a cavity formed on the underside of body 22 for receiving and shielding the near side cutting blade (not shown). Near side cutting chamber 28 comprises hub 60 and axial scroll 62. Hub 60 comprises a portion of body 22 centrally located within chamber 28 and providing a blade mounting portion 64 to rotatably support the far side cutting blade for rotation about near side axis 66. In the example illustrated, blade mounting portion 64 comprises an aperture extending through hub 60 of body 22 through which a blade shaft or blade bearing assembly extends.

Axial scroll 62 comprises a channel helically extending about axis 66. Axial scroll 62 comprises an upper surface 70 (appearing as a floor in the inverted deck of FIG. 1) bound by sidewalls 72, 74. Upper surface 70 axially scrolls about axis 66 such that scroll 62 is shallowest and such that upper surface 70 is a vertically lowest at start region 76 of scroll 62 and such that scroll 62 is the deepest and vertically highest at end region 78, the junction between scroll 62 and discharge passage 24.

In the example illustrated, scroll 62 extends at least 180° and nominally 240° about axis 66. Upper surface 70 of scroll 62 has scroll height change of less than 2 inches from start region 76 to end region 78. With such an example, a sufficiently large amount of airflow is produced to move grass clippings and other cut material while at the same time maintaining a low profile for the deck insert 20, allowing deck insert 20 to better fit beneath a mower chassis. In other implementations, scroll 62 may scroll about axis 66 by other extents and have a different scrolling rate with a different height change.

Upper surface 70 of scroll 62 feeds into discharge passage 24 at end region 78 at a height below (above in the inverted view of deck insert 20 shown by FIG. 1) the adjacent portion 80 of ceiling 34 of discharge passage 24. In the example illustrated, end region 78 of scroll 62 terminates at a shoulder or step 82 which transitions between the lower height of upper surface 70 and the greater height of region 80 of ceiling 34. At the same time, upper surface 70 of scroll 62 at end region 78 is also at a height below (above in the inverted view of deck insert 20 shown in by FIG. 1) the height of end region 58 of scroll 42.

Figure 3:
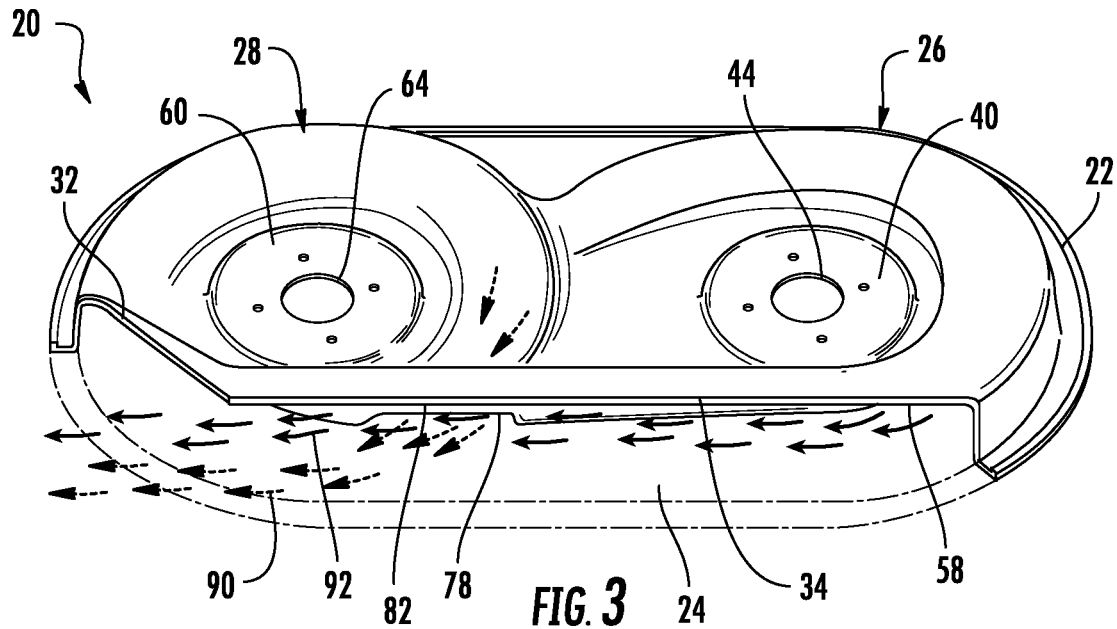
FIG. 3 is a sectional view of the deck insert of FIG. 2 taken along lines 3-3.

FIG. 3 is a sectional view of the upright mower deck insert 20 of FIG. 2 taken along line 3-3. As shown by FIG. 3, because upper surface 70 of scroll 62 at end region 78 feeds into discharge passage 24 at a lower height as compared to upper surface 50 of scroll 42 at end region 48, airflow and cut material from near side chamber 28, indicated by dashed arrows 90, are fed into discharge passage 24 below the airflow and cut material from far side chamber 26, indicated by solid line arrows 92. As a result, mower deck insert 20 vertically partitions the cross-sectional area and volume of discharge passage 24: an upper cross-sectional area or volume for airflow and cut material from far side chamber 26 and a lower cross-sectional area or volume for airflow and cut material from near side chamber 28. Heavier cut material from far side chamber 26, due to its longer travel distance, naturally falls into the airflow stream of nearside chamber 28 indicated by arrows 90, rather than falling out of the airflow stream altogether. Because mower deck insert 20 discharges airflow from chambers 26, 28 into distinct vertical portions of discharge passage 24, the airflow streams represented by arrows 92 and 90 from chambers 26 and 28, respectively, are less likely to interfere with one another. As a result, deck insert 20 provides greater bulk deck airflow, the total airflow exiting deck insert 20 from both chambers 26, 28 through discharge opening 32. The greater airflow provided by deck insert 20 more effectively disperses cut materials over the terrain or more effectively propels cut materials into a collection volume carried by the mower. The greater airflow provided by mower deck insert 20 additionally creates a stronger upward vacuum below deck insert 20, more effectively lifting uncut grass or vegetation for cutting by the cutting blades.

Figure 4:
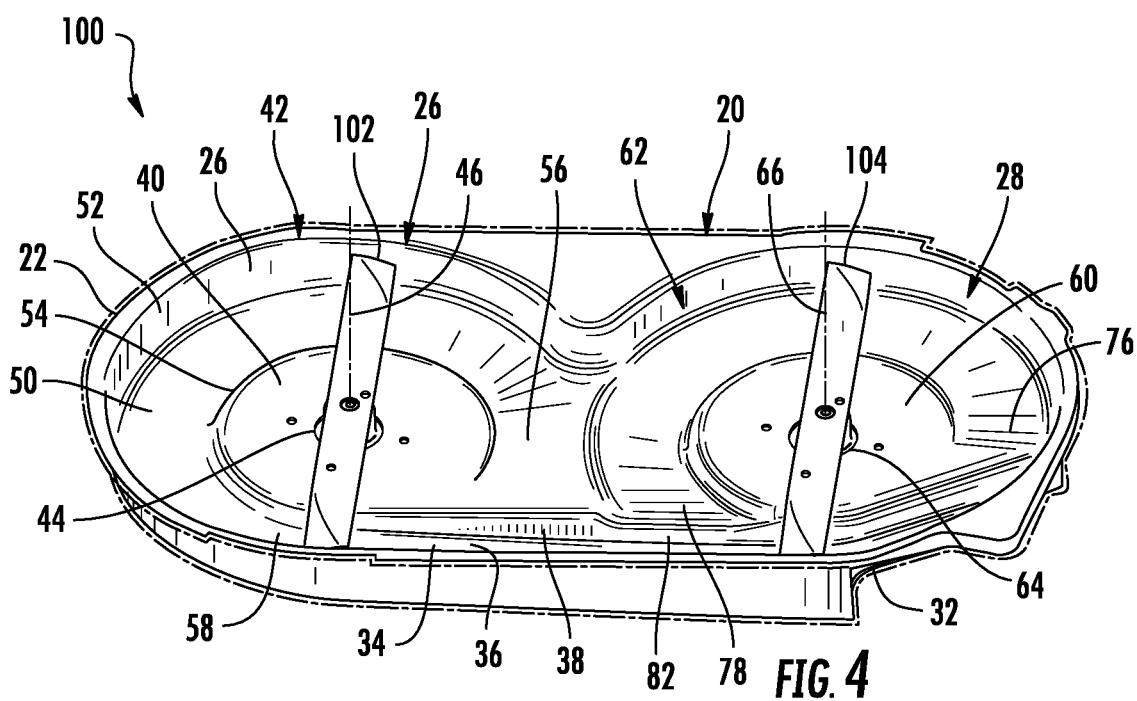
FIG. 4 is a perspective view of an example cutting unit comprising the inverted deck insert of FIG. 1 within the mower deck and including blades.

Because the configuration of mower deck insert 20 offers greater airflow for a particular pair of cutting blades being rotatably driven at a particular speed, mower deck insert 20 further facilitates the provision of a mower cutting unit that produces less noise, for a given airflow. FIG. 4 illustrates an example mower cutting unit 100 which produces less noise as compared to existing cutting units producing equivalent amounts of airflow. Mower cutting unit 100 comprises mower deck insert 20, far side cutting blade 102 and nearside cutting blade 104. Far side cutting blade 102 and nearside cutting blade 104 are rotatably mounted within chambers 26, 28 with rotation about axes 46 and 66, respectively. As compared to mower deck 4, mower deck insert 20 produces similar bulk airflow through discharge opening 32 with less noise.

Figure 5:
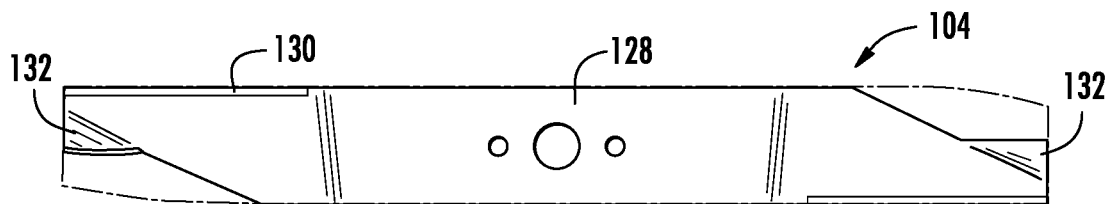
FIG. 5 is a top view of an example cutting blade of the cutting unit of FIG. 4.
Figure 6:
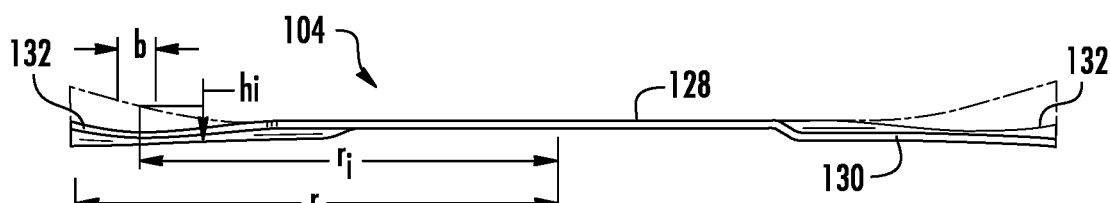
FIG. 6 is a side view of the cutting blade of FIG. 5.

FIGS. 5 and 6 illustrate an example cutting blade 104 of cutting unit 100. In the example illustrated, cutting blade 102 has a same shape and size as cutting blade 104. In other implementations, cutting blade 102 may have other configurations than cutting blade 104. Cutting blade 104 comprises central portion 128, cutting edges 130 and lift wings 132. When blade 104 is mounted within chamber 28 of mower deck insert 20, central portion 128 radially extends from axis 66 (shown in FIG. 4) and is configured to rotate below hub 60. Cutting edges 130 are configured so as to rotate beneath scroll 62 while cutting grass or other vegetation. Lift wings 132 extend adjacent and behind cutting edges 130 and are configured so as to displace air and cut material or vegetation to produce airflow about axis 66 in an upwardly angled direction for lift. FIGS. 5 and 6 further illustrate, in broken lines, the configuration of cutting blades 122 and 124 of cutting unit 110. As shown by FIGS. 5 and 6, in one implementation, cutting unit 100 comprises cutting blades 102, 104 with lift wings 132 which are reduced in size as compared to the corresponding lift wings of blades 122, 124 (shown broken lines). As a result, cutting unit 100 produces less noise.

In one implementation, cutting unit 100 is configured such that cutting blades 102 and 104 have a combined or total net radial weighted frontal area AWFnet such that cutting unit 100 outputs bulk airflow through discharge opening 32 at a rate of at least 600 cubic feet per minute at standard condition (SCFM) at a sound power of less than or equal to 104 decibels (dB). In another implementation, cutting unit 100 is configured such that cutting blades 102 and 104 have a combined or total net radial weighted frontal area such that cutting unit 100 outputs bulk airflow through discharge opening 32 at a rate of at least 700 cubic feet per minute at standard condition (SCFM) at a sound power of less than or equal to 104 decibels (dB), nominally less than or equal to 103.2 dB. In one implementation, cutting unit 100 is configured such that cutting blades 102 and 104 have a combined or net radial weighted frontal area AWFnet and such that cutting unit 100 outputs bulk airflow through discharge opening 32 at a rate of at least 340 SCFM plus 70 times the net radial weighted frontal area AWFnet of blades 102 and 104.

Figure 7:
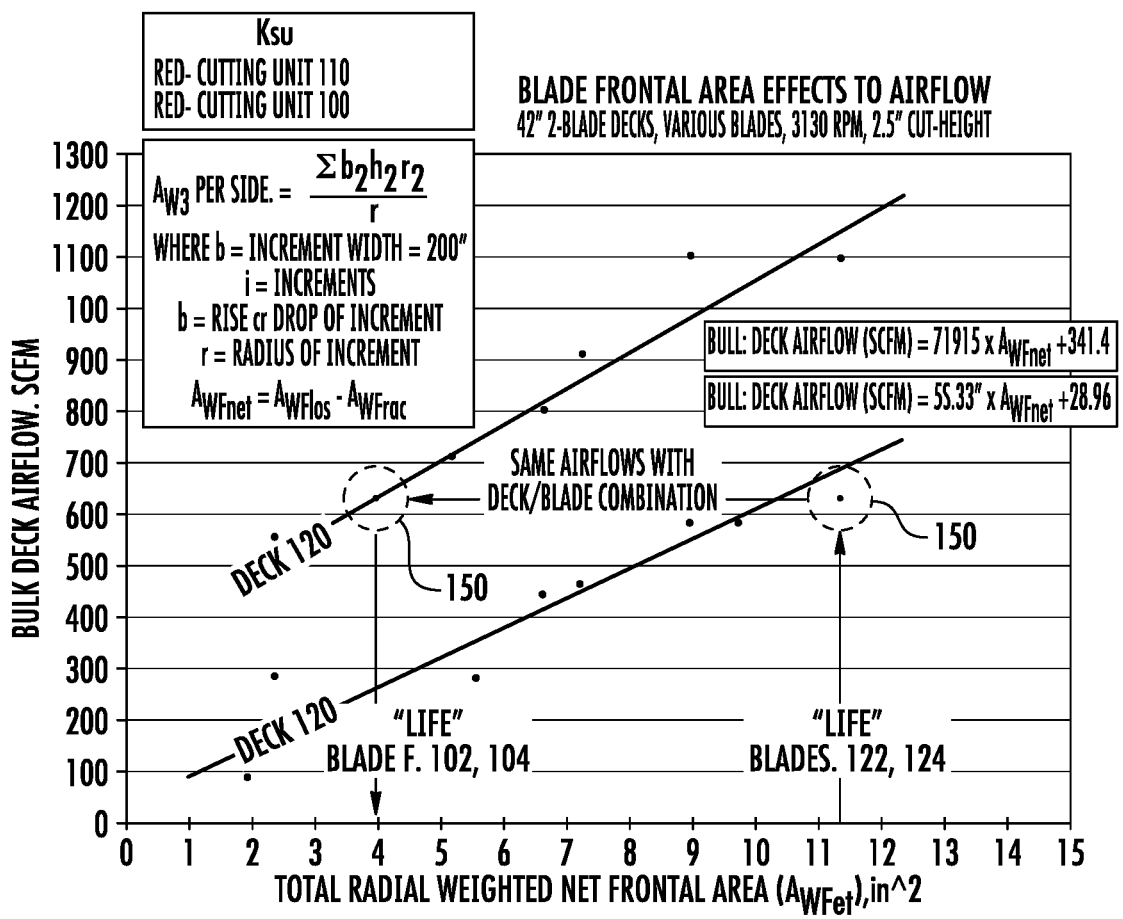
FIG. 7 is a graph comparing bulk deck airflow as a function of total radial weighted net frontal area for blades for an example cutting unit of FIG. 4 and the prior art cutting unit of FIG. 5.

For purposes of this disclosure, the net radially weighted frontal area comprises the radially weighted frontal area of all the blades of a cutting unit. A radially weighted frontal area of a cutting blade is calculated according to the following: AWF (per side)=$\Sigma b_i h_i r_i / r$, where b=increment width, i=increment, h=rise or drop of increment and r=radius of increment, examples of which are illustrated in FIG. 7. AWFnet is calculated according to AWFpos−AWFneg.

Figure 8:
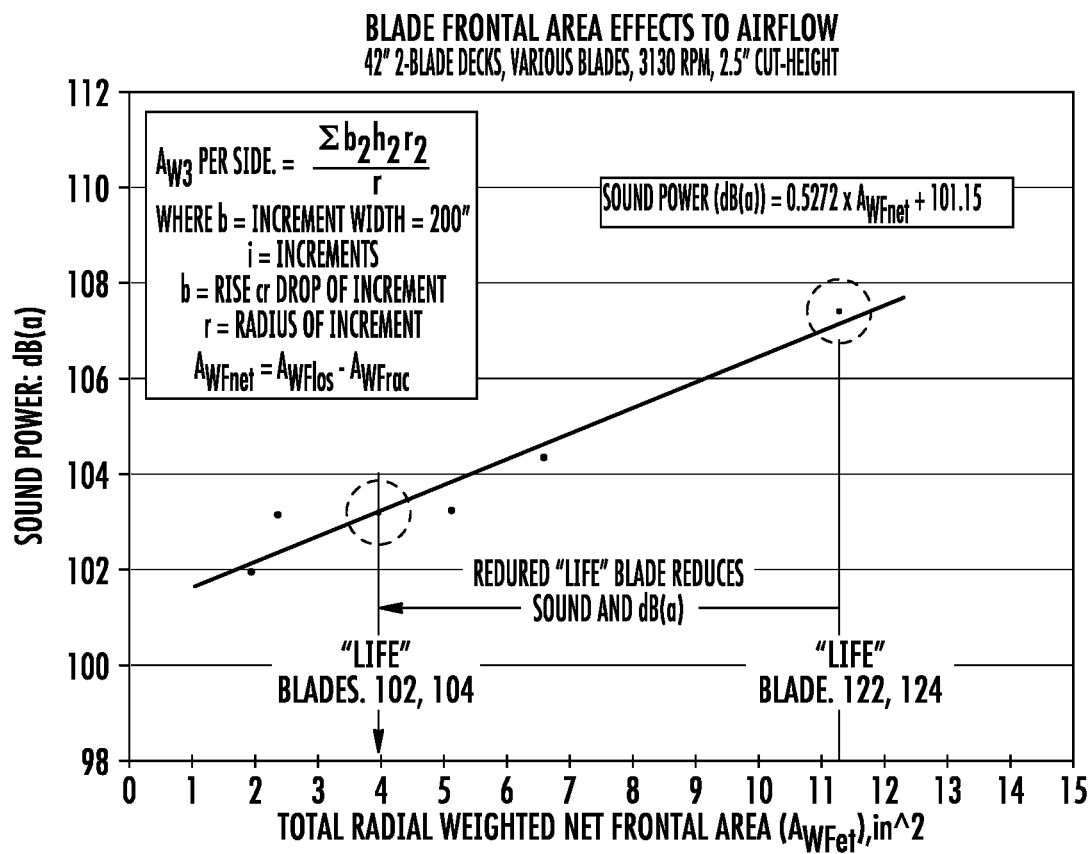
FIG. 8 is a graph of sound power as a function of total radial weighted net frontal area for the blades of the cutting unit of FIG. 4.

FIGS. 7 and 8 graphically compare output of cutting units comprising mower deck insert 20 having various cutting blades 102, 104 with different radial weighted net frontal areas with the cutting unit illustrated in FIG. 5 having different radially weighted net frontal areas. In the comparison illustrated in FIGS. 7 and 8, cutting units 100 and 110 are both two-blade 42 inch decks set at a cut height of 2.5 inches. Such comparison is made when each of the cutting blades of the cutting unit 100 and 110 are rotating at 3130 revolutions per minute.

FIG. 7 graphically depicts the bulk deck airflow in SCFM as a function of total radial weighted net frontal area for cutting unit 100 with mower deck insert 20 and blades 102, 104 as compared to cutting unit 110 with mower deck 120 and cutting blades 122, 124. As shown by FIG. 8, cutting unit 100 produces bulk deck airflow at a rate of 341.4 SCFM plus a 71.915 multiple of the total radial weighted net frontal area. As shown by FIG. 7, in one implementation, cutting unit 100 provided with cutting blades 102, 104 having a total radial weighted net frontal area of only 4 inches squared produces the same bulk deck airflow as cutting unit 110 requiring cutting blades 122, 124 to have a total radially weighted net frontal area of at least 11 inches squared.

FIG. 8 graphically depicts the sound power or noise level of cutting unit 100 is a function of the total radial weighted net frontal area of cutting blades 102, 124. Sound differences due to the different configurations of decks 20 and 120, independent of blade configuration are negligible. As shown by FIG. 8, blades 102, 104 having reduced lift wings 132, when employed in cutting unit 100 and producing a bulk deck airflow 150 (shown in FIG. 8), reduce sound power or noise by at least 3 dB and nominally by at least 4 dB as compared to blades 122, 124 employed in cutting unit 110 when producing the same bulk deck airflow 150 (shown in FIG. 7). As shown by FIGS. 7 and 8, cutting unit 100 with cutting blades 102, 104 reduces noise while maintaining airflow generation to maintain the vacuum lifting of the uncut vegetation for cutting and to maintain the discharge characteristics for cut vegetation.

Figure 9:
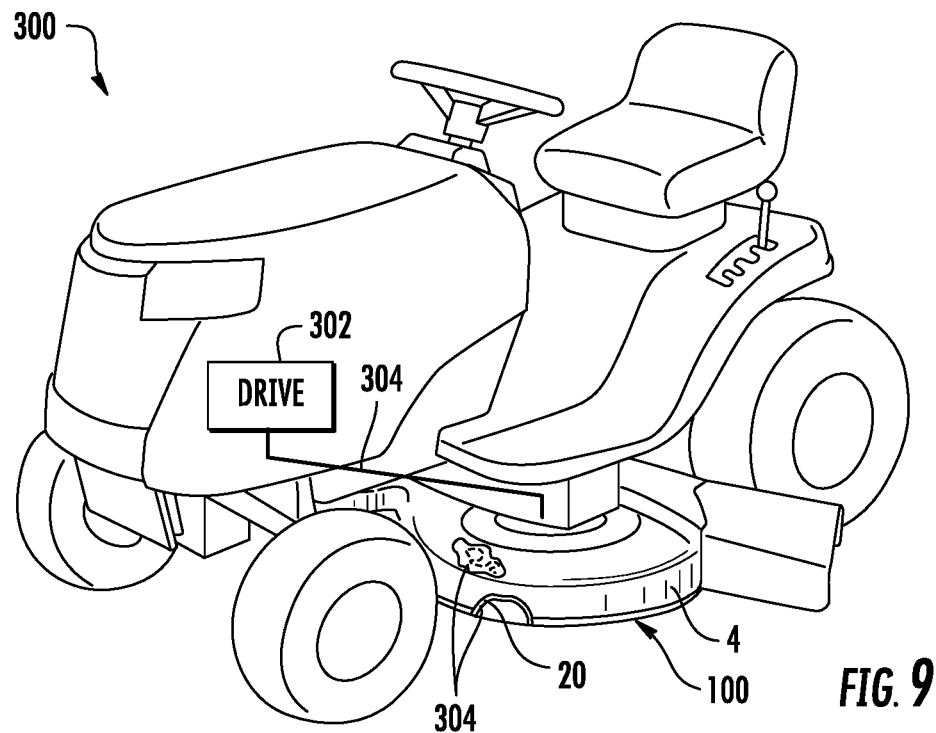
FIG. 9 is a perspective view of an example mower comprising the cutting unit of FIG. 4.

FIG. 9 is a perspective view of an example mower 300 comprising cutting unit 100. As shown by FIG. 9, mower 300 comprises a riding mower additionally comprising drive 302 and transmission 304, both of which are schematically illustrated. Drive 302 supplies power to rotate blades 102, 104 (shown in FIG. 4) of cutting unit 100. In one implementation, drive 302 comprises an internal combustion engine. In another implementation, drive 302 comprises a motor, such as an electric motor.

Transmission 304 transmits power or torque from drive 302 to each of cutting blades 102, 104 of cutting unit 100. In one implementation, transmission 304 comprises a series of belts and pulleys which transmit torque to each of blades 102, 104. In other implementations, transmission 304 may have other configurations such as chain and sprocket or gear train assemblies. As noted above, in other implementations, cutting unit 100 and deck insert 20 may alternatively be utilized in walk behind self-propelled and push mowers, and ZTR units.

As shown by those portions of deck 4 broken away in FIG. 9, in one implementation, the internal gaps or voids between deck 4 and deck insert 20 are at least partially filled with a filler material 304, such as an open cell or closed cell foam. In one implementation, once deck insert 20, has been mounted to deck 4, a foam material is injected through a provided nozzle opening into the one or more continuous voids between deck 4 and deck insert 20. The filler material 304 further reduces noise during the operation of mower 300. In one implementation, the filler material 304 comprises a material that does not bond or adhere to the interior surfaces of deck 4, allowing the filler material 304 to be peeled away from the underside of deck 4, when deck insert 20 is being replaced. In yet another implementation, the filler material 304 comprises a material configured to be manually broken apart or chipped away, allowing filler material 304 to be removed from the underside of deck 4 when deck insert 20 is being replaced or is no longer being used. In some implementations, filler material 304 is not added or is added to selected voids or gaps between deck 4 and deck insert 20.

Although mower deck insert 20 is illustrated for deck insertion into mower deck 4, mower deck insert 20 is also configured to be mounted into other mower decks having two adjacent or side-by-side cutting chambers 14 leading to a discharge opening 16. The precise configuration or interior profile of mower deck 4 may have various configurations while still being different than the configuration and interior profile provided by mower deck insert 20. For example, in one implementation, mower deck insert 20 may alternatively be mounted into a mower deck 4 that has a continuous square or rectangular underside cavity, omitting projection 17 shown in FIG. 1. Mower deck insert 20 may alternatively be mounted to into a mower deck 4 having a completely different ceiling shape with differently shaped projections and recesses, wherein mower deck insert 20 so has a different interior profile as compared to that of mower deck 4.

Figure 10:
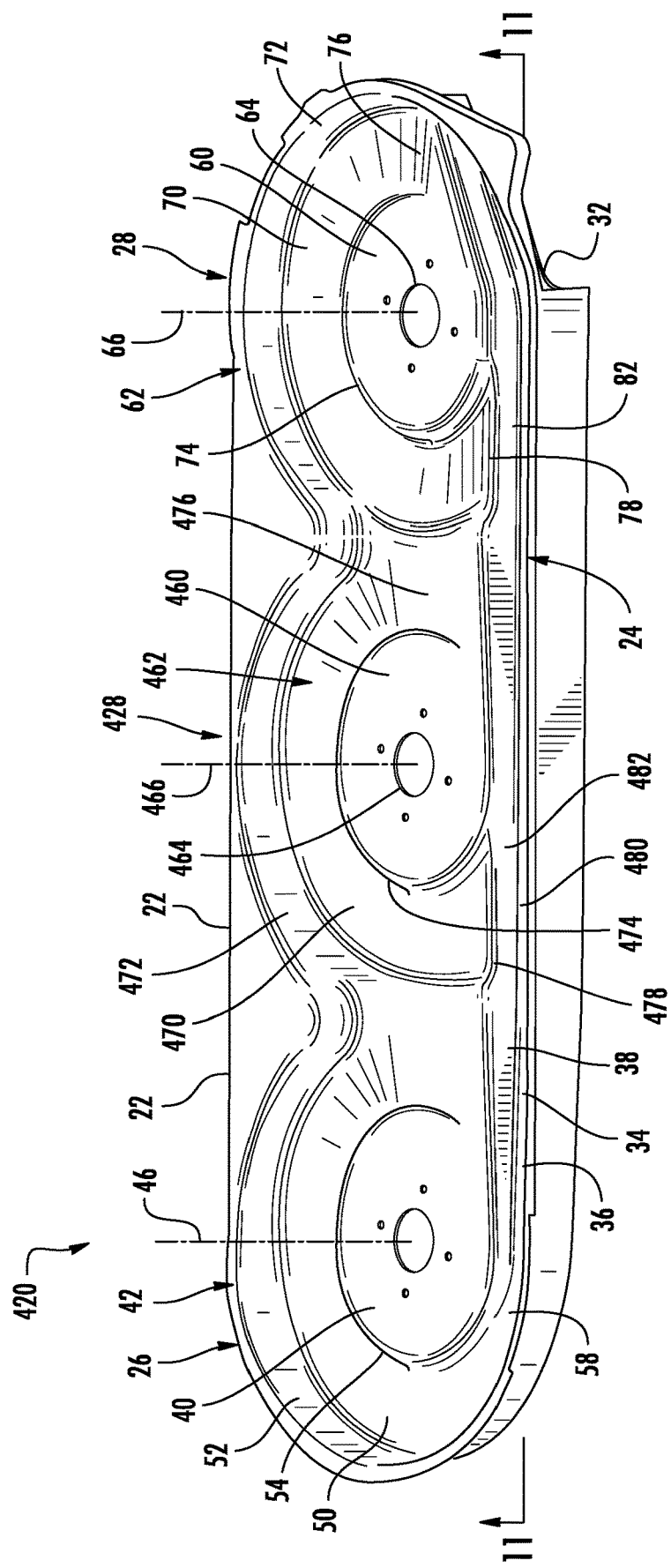
FIG. 10 is a perspective view of another example inverted mower deck.
Figure 11:
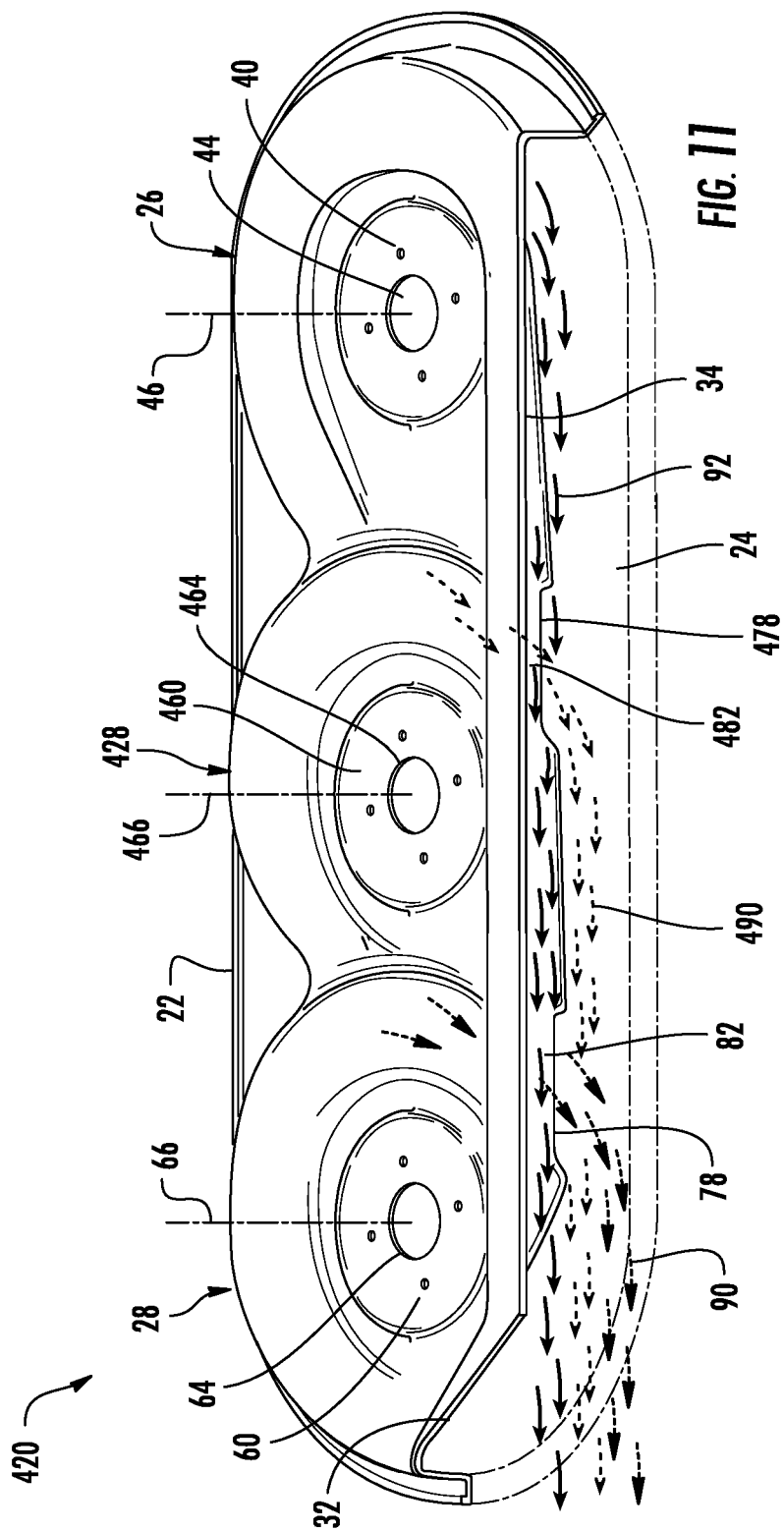
FIG. 11 is a sectional view of the mower deck of FIG. 10 taken along lines 11-11.

FIGS. 10 and 11 illustrate mower deck insert 420, another example implementation of mower deck insert 20. Mower deck insert 420 is similar to mower deck insert 20 except that mower deck insert 420 comprises three sequentially or serially located or formed cutting chambers for receiving three corresponding rotatably driven cutting blades. Similar to mower deck insert 20, mower deck insert 420 comprises far side cutting chamber 26 and nearside cutting chamber 28, described above. Unlike mower deck insert 20, mower deck insert 420 additionally comprises an intermediate cutting chamber 428. Those remaining components of mower deck insert 420 which correspond to components of mower deck insert 20 are numbered similarly.

Intermediate cutting chamber 428 is similar to nearside cutting chamber 28 except that intermediate cutting chamber 428 feeds airflow and cut vegetation into a different vertical cross-sectional area or volume of discharge chute to reduce potential airstream interference to increase bulk deck airflow. In the example illustrated, intermediate cutting chamber 428 feeds airflow and cut vegetation into a cross-sectional area of discharge passage 24 that is vertically between ceiling 34 of discharge passage 24 and upper surface 70 of scroll 62 at the junction of scroll 62 with discharge passage 24.

Intermediate cutting chamber 428 comprises a cavity formed on an underside of body 22 for receiving and shielding an intermediate cutting blade (not shown). Intermediate cutting chamber 428 comprises hub 460 and axial scroll 462. Hub 460 comprises a portion of body 22 centrally located within chamber 428 and providing a blade mounting portion 464 to rotatably support the intermediate cutting blade for rotation about intermediate axis 466. In the example illustrated, blade mounting portion 464 comprises an aperture extending through hub 460 of body 22 through which a blade shaft or blade bearing assembly extends.

Axial scroll 462 comprises a channel helically extending about axis 466. Axial scroll 462 comprises an upper surface 470 (appearing as a floor in the inverted deck of FIG. 11) bound by sidewalls 472, 474. Upper surface 470 axially scrolls about axis 466 such that scroll 462 is shallowest and such that upper surface 470 is a vertically lowest at start region 476 of scroll 462 and such that scroll 462 is the deepest and vertically the highest at end region 478, the junction between scroll 62 and discharge passage 24.

In the example illustrated, scroll 462 extends at least 180° and nominally 240° about axis 466. Ceiling 470 of scroll 462 has scroll height change of less than 2 inches from start region 476 to end region 478. With such an example, a sufficiently large amount of airflow is produced to move grass clippings and other cut material while at the same time maintaining a low profile for the mower deck insert 420, allowing mower deck insert 420 to better fit beneath a mower chassis. In other implementations, scroll 462 may scroll about axis 466 by other extents and have a different scrolling rate with a different height change.

Upper surface 470 of scroll 462 feeds into discharge passage 24 at end region 478 at a height below (above in the inverted view of deck insert 420 shown by FIG. 10) the adjacent portion 480 of ceiling 34 of discharge passage 24. In the example illustrated, end region 478 of scroll 462 terminates at a shoulder or step 482 which transitions between the lower height of upper surface 470 and the greater height of region 480 of ceiling 34 of discharge passage 24. At the same time, upper surface 470 of scroll 462 at end region 478 is also at a height below (above in the inverted view of deck 120 shown in by FIG. 10) the height of end region 58 of scroll 42, but above (below in the inverted view of mower deck insert 420 shown in FIG. 10) the height of end region 78 of scroll 62. In one implementation, step 482 of scroll 462 has a height in a range of 0.5 inches and 0.75 inches while step 82 of scroll 62 has a height of at least 1 inch and nominally 1.25 inches. In other implementations, the height or depth of the cross-sectional area of discharge passage 24 may be partitioned or divided amongst the outlets or in regions 58, 78, 478 of the three tangentially located cutting chambers 26, 28, 428, respectively, in other manners. Although mower deck insert 420 is illustrated as including three cutting chambers having axially scrolling upper surfaces, in other implementations, mower deck insert 420 may include greater than three such chambers serially arranged with respect to one another or alternatively arranged tangential to and on both sides of discharge passage 24.

FIG. 11 is a sectional view of the mower deck insert 420 of FIG. 10 taken along line 11-11 with mower deck insert 420 in an upright, operational orientation. As shown by FIG. 11, because upper surface 470 of scroll 462 at end region 478 feeds into discharge passage 24 at a lower height as compared to upper surface 50 of scroll 42 at end region 48, airflow and cut material from intermediate chamber 428, indicated by dashed arrows 490, are fed into discharge passage 24 below the airflow and cut material from far side chamber 26, indicated by solid line arrows 92. Because upper surface 70 of scroll 62 at end region 78 feeds into discharge passage 24 at a lower height as compared to upper surface 470 of scroll 462 at end region 478, airflow and cut material from near side chamber 28, indicated by dashed arrows 90, are fed into discharge passage 24 below the airflow and cut material from intermediate chamber 428, indicated by arrows 490 as well as below the airflow and cut material from far side chamber 26. As a result, mower deck insert 420 vertically partitions the cross-sectional area and volume of discharge passage 24: an upper cross-sectional area or volume for airflow and cut material from far side chamber 26, and intermediate cross-sectional area or volume for airflow and cut material from intermediate chamber 428 and a lower cross-sectional area or volume for airflow and cut material from near side chamber 28. Heavier cut material from far side chamber 26, due to its longer travel distance, naturally falls into the airflow stream of intermediate chamber 428 indicated by arrows 490. Heavier cut material from intermediate chamber 428 naturally falls into the airflow stream of near side chamber 28 indicated by arrows 90.

Because mower deck insert 420 discharges airflow from chambers 26, 28, 428 into distinct vertical portions of discharge passage 24, the airflow streams represented by arrows 92, 90 and 490 from chambers 26, 28 and 428, respectively, are less likely to interfere with one another. As a result, mower deck insert 420 provides greater bulk deck airflow, the total airflow exiting mower deck insert 420 from chambers 26, 28 and 428 through discharge opening 32. The greater airflow provided by mower deck insert 420 more effectively disperses cut materials over the terrain or more effectively propels cut materials into a collection volume carried by the mower. The greater airflow provided by mower deck insert 420 additionally creates a stronger upward vacuum below mower deck insert 420, more effectively lifting grass or vegetation for cutting by the cutting blades. Moreover, the greater airflow allows the creation of cutting units that produce the same or greater airflow but with less noise as compared to existing cutting units.

Figure 12:
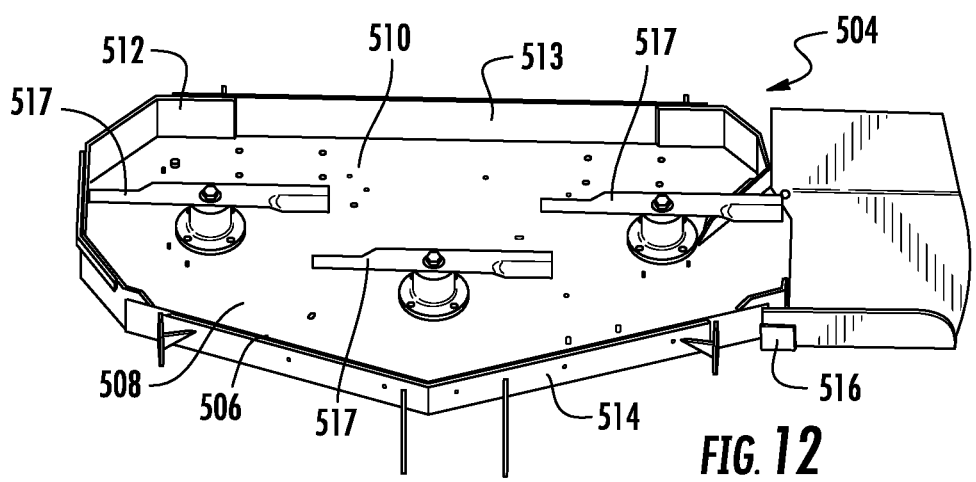
FIG. 12 is a perspective view of an inverted mower deck and cutting blades.

FIG. 12 illustrates an example inverted mower deck 504 for reception of mower deck insert 520 shown in FIGS. 13A-13E. In the example illustrated, mower deck 504 has an underside cavity 506 with an interior profile 508. Interior profile 508 is defined by ceiling 510 and side walls 512. In the example illustrated, sidewalls 512 comprise a linear sidewall portion 513 and an angled sidewall portion 514. Underside cavity 506 has an opening which serves as discharge opening 516. In the example illustrated, deck 504 omits circular cutting chambers, but instead has an open underside volume for supporting three cutting blades 517. In the example illustrated, deck 504 is formed from metal, such as steel plates.

Figure 13A:
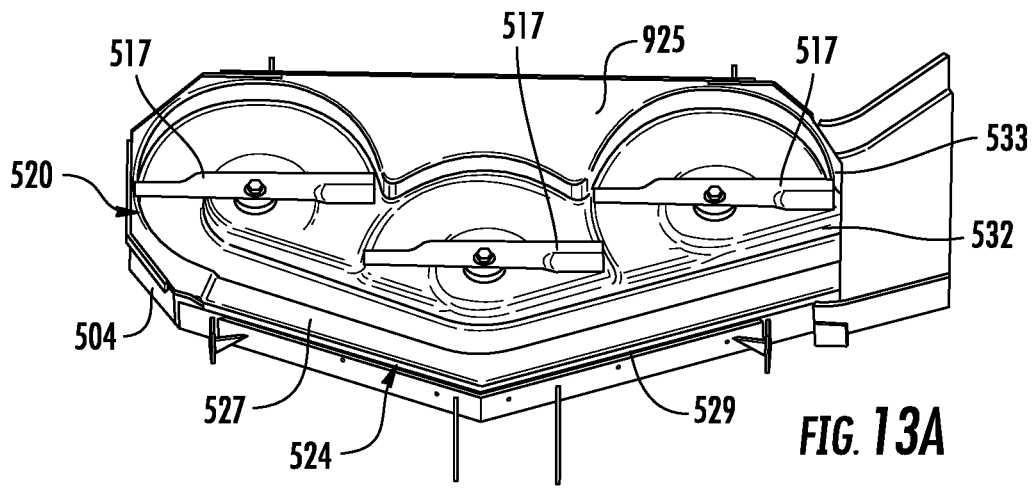
FIG. 13A is a perspective view of an example deck insert mounted to the mower deck of FIG. 12.
Figure 13B:
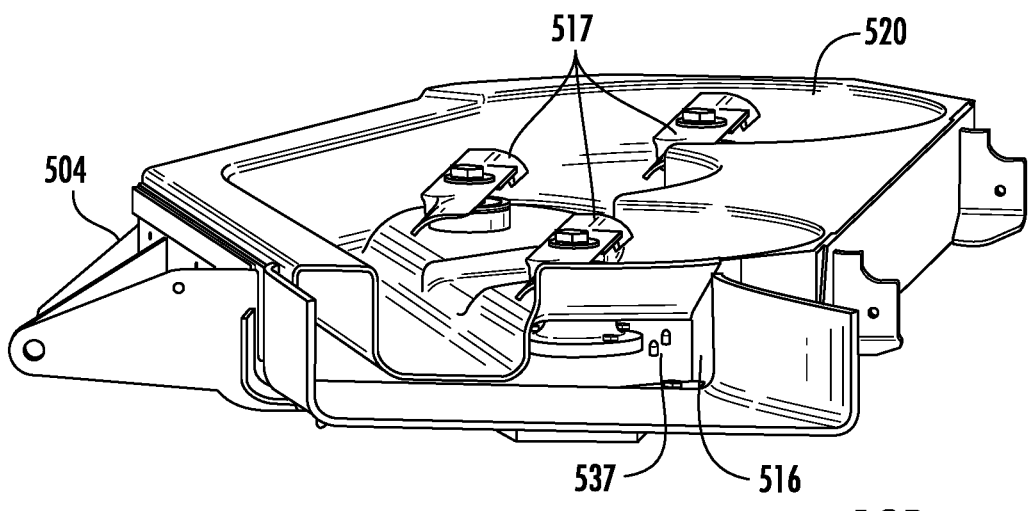
FIG. 13B is another perspective view of the deck insert of FIG. 13A mounted to into the inverted mower deck of FIG. 12.
Figure 13C:
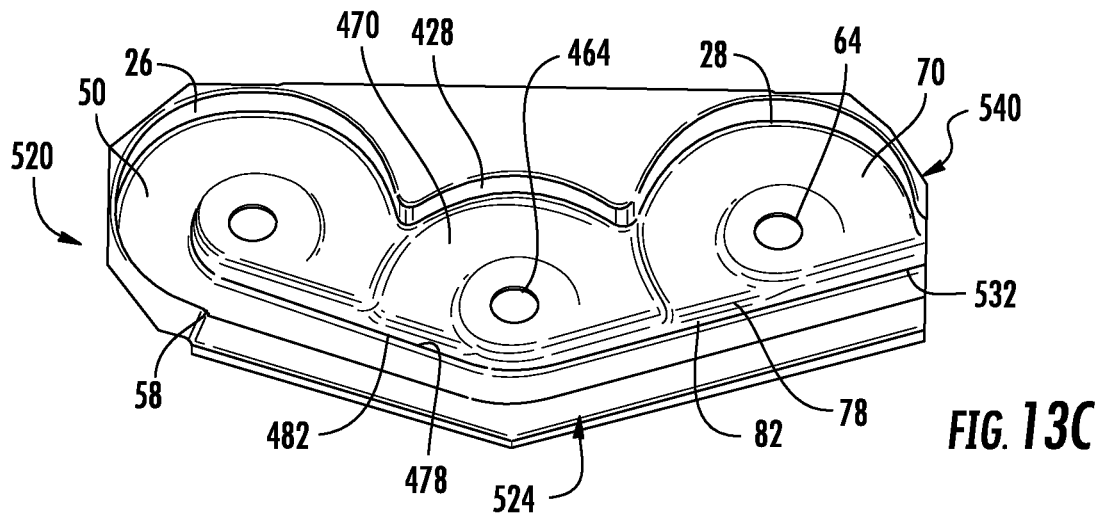
FIG. 13C is a perspective view of the deck insert of FIG. 13A in an inverted orientation.
Figure 13D:
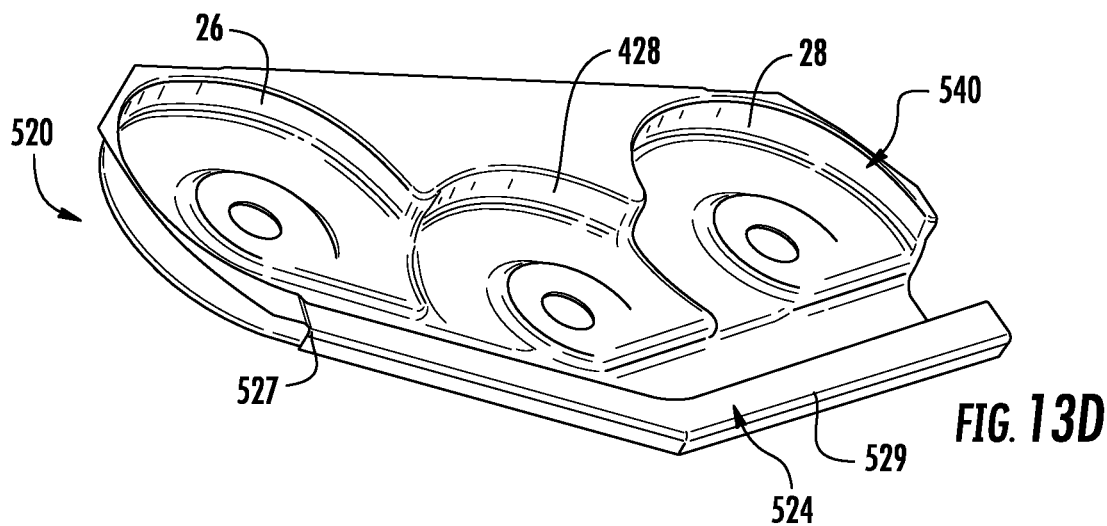
FIG. 13D is another perspective view of the deck insert of FIG. 13A in an inverted orientation.
Figure 13E:
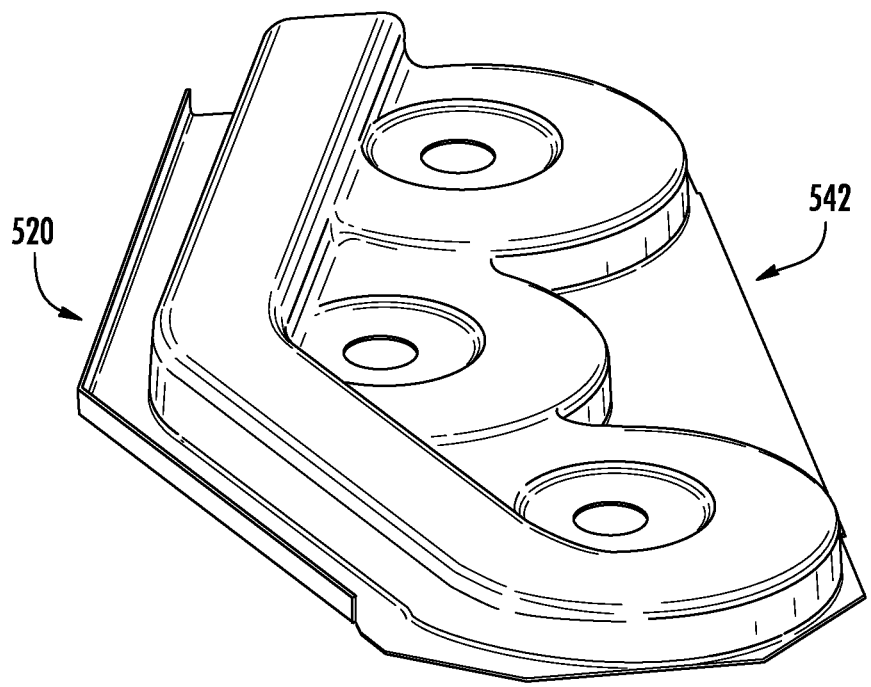
FIG. 13E is a perspective view of the deck insert of FIG. 13A in an upright orientation.
Figure 14A:
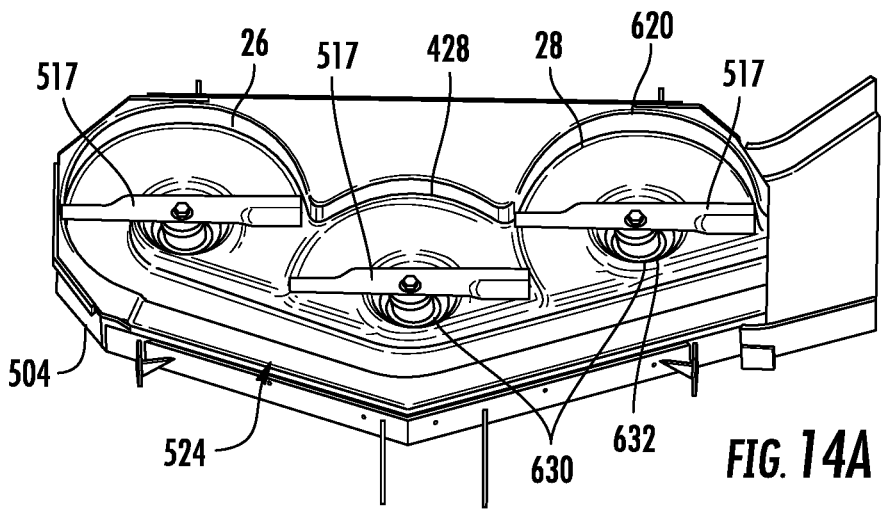
FIG. 14A is a perspective view of another example deck insert mounted to into the mower deck of FIG. 12.
Figure 14B:
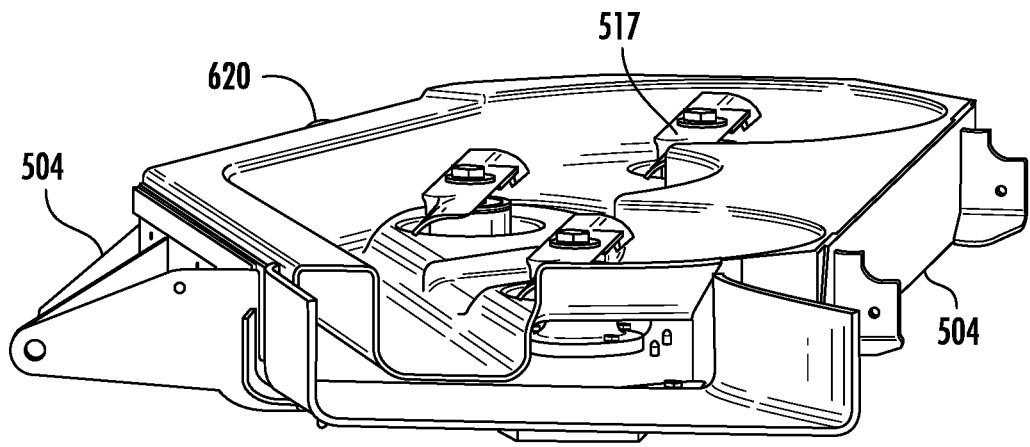
FIG. 14B is another perspective view of the deck insert of FIG. 14A mounted to into the inverted mower deck of FIG. 12.
Figure 14C:
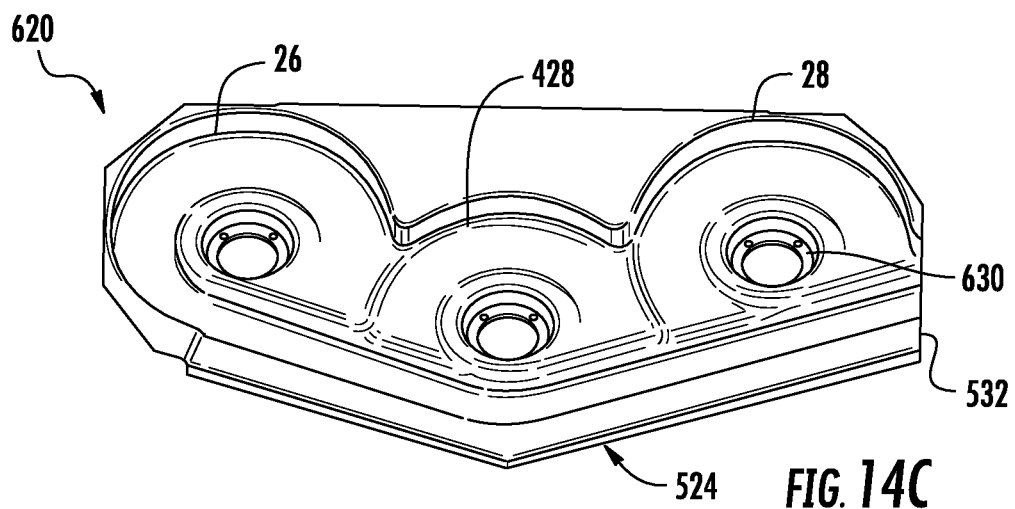
FIG. 14C is a perspective view of the deck insert of FIG. 14A in an inverted orientation.
Figure 14D:
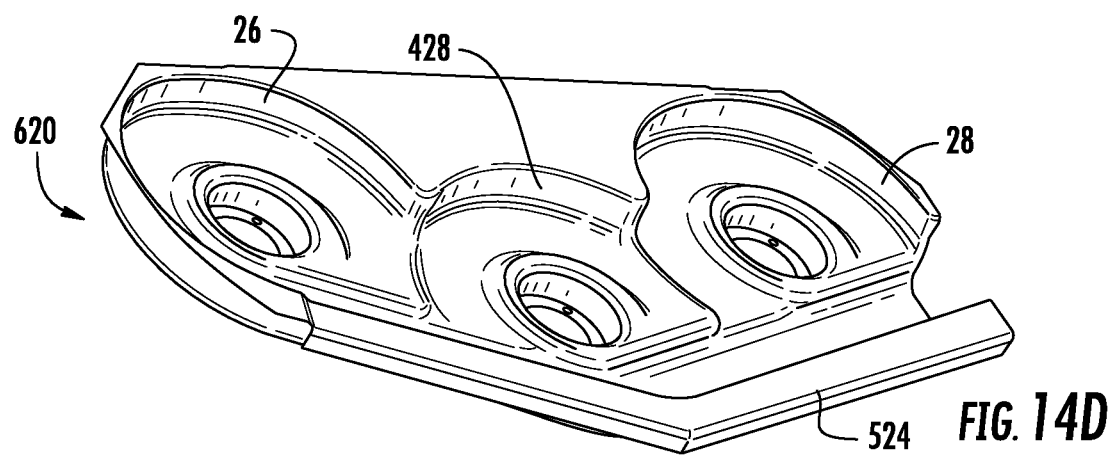
FIG. 14D is another perspective view of the deck insert of FIG. 14A in an inverted orientation.
Figure 14E:
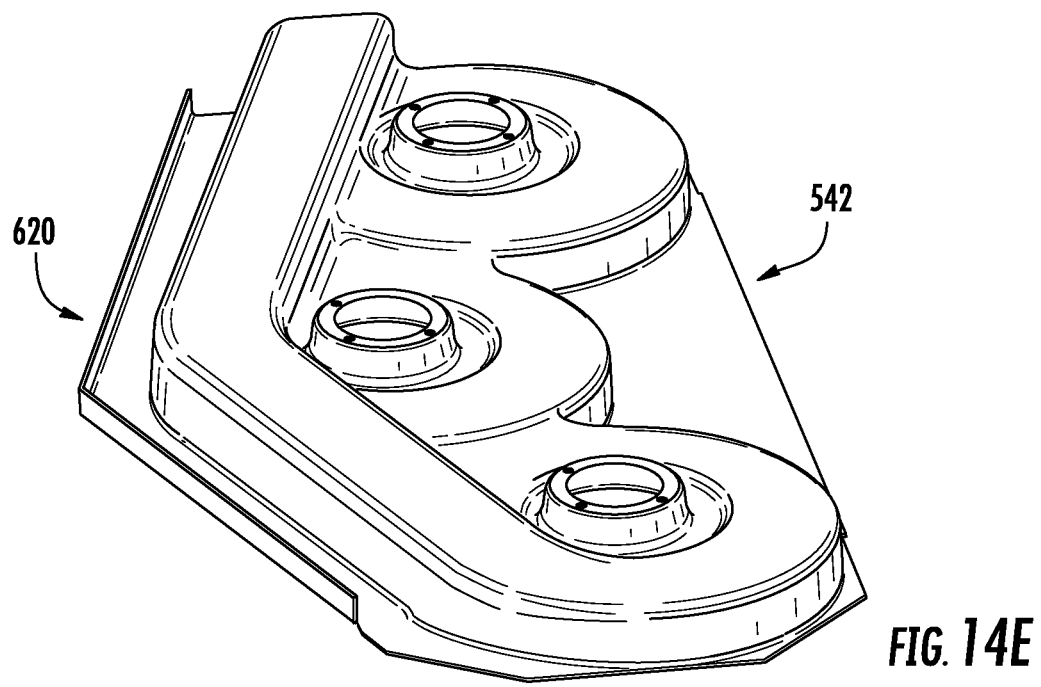
FIG. 14E is a perspective view of the deck insert of FIG. 14A in an upright orientation.
Figure 15A:
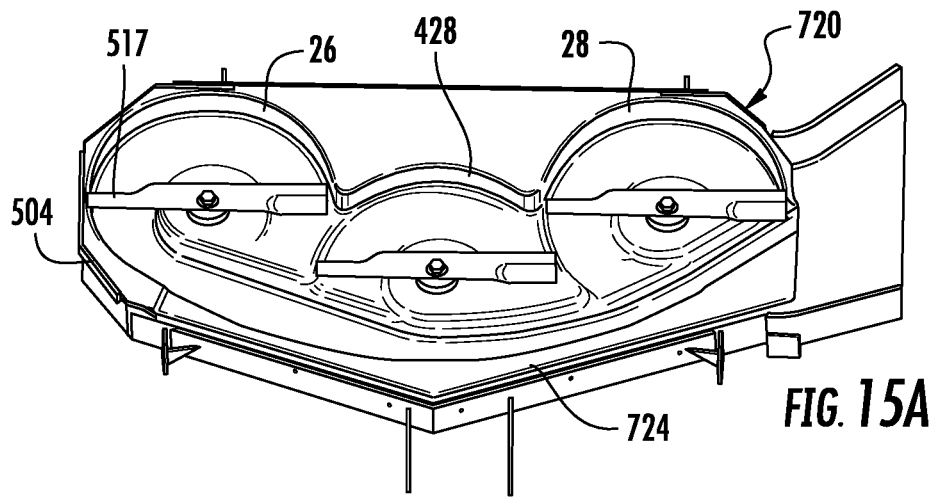
FIG. 15A is a perspective view of an example deck insert mounted to into the mower deck of FIG. 12.
Figure 15B:
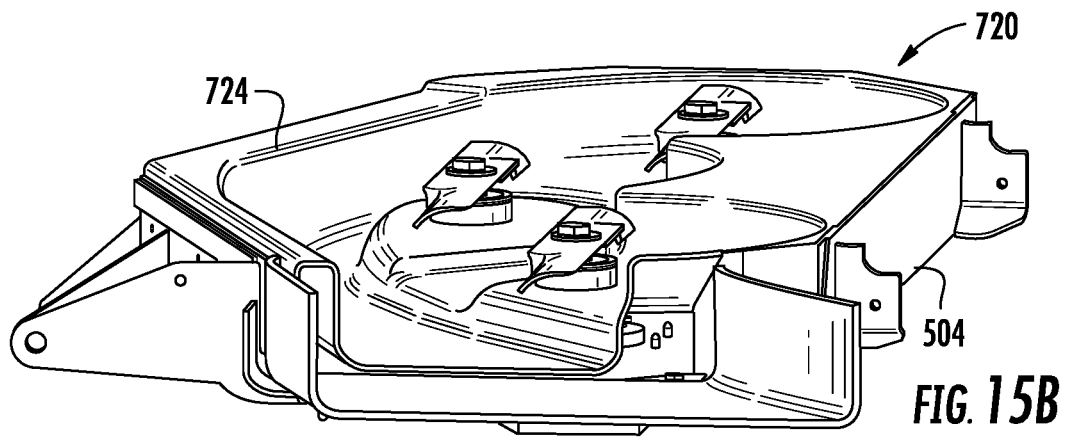
FIG. 15B is another perspective view of the deck insert of FIG. 15A mounted to into the inverted mower deck of FIG. 12.
Figure 15C:
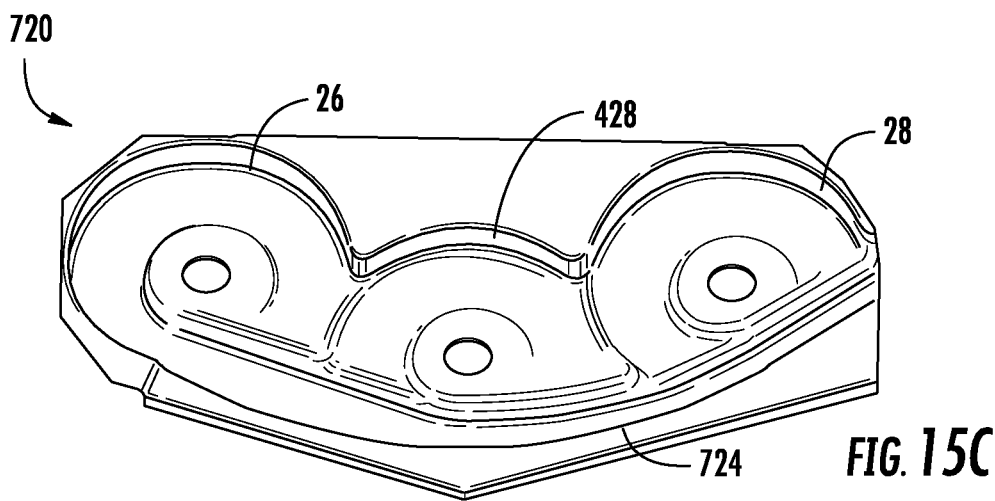
FIG. 15C is a perspective view of the deck insert of FIG. 15A in an inverted orientation.
Figure 15D:
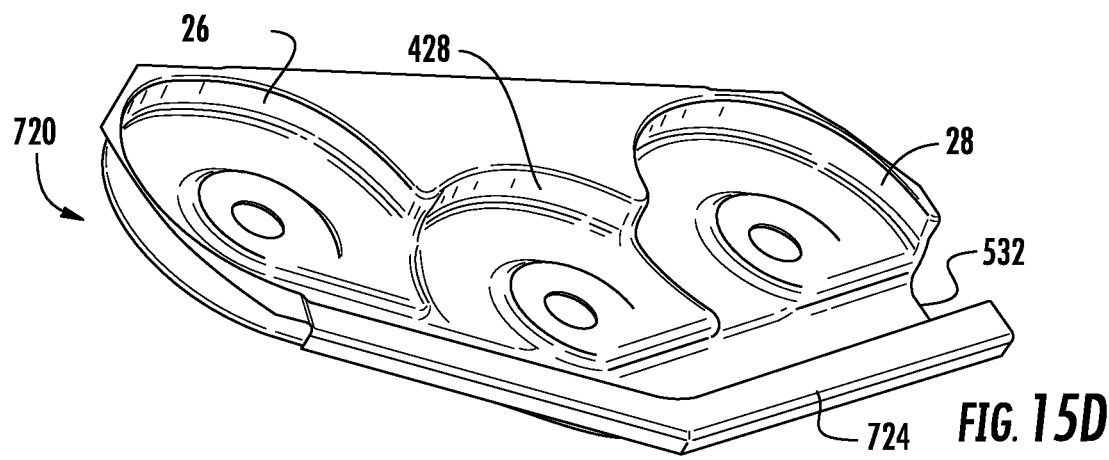
FIG. 15D is another perspective view of the deck insert of FIG. 15A in an inverted orientation.
Figure 15E:
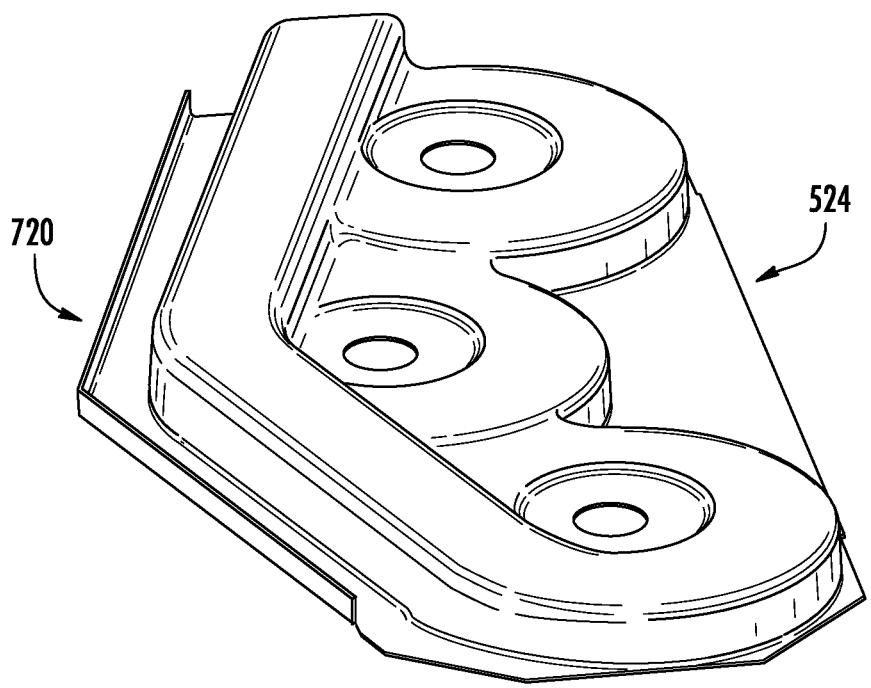
FIG. 15E is a perspective view of the deck insert of FIG. 15A in an upright orientation.
Figure 16A:
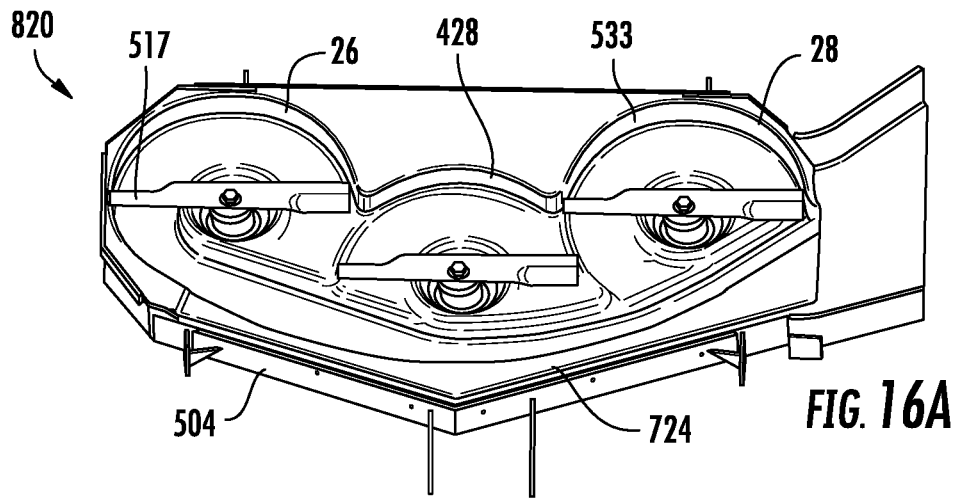
FIG. 16A is a perspective view of an example deck insert mounted to into the mower deck of FIG. 12.
Figure 16B:
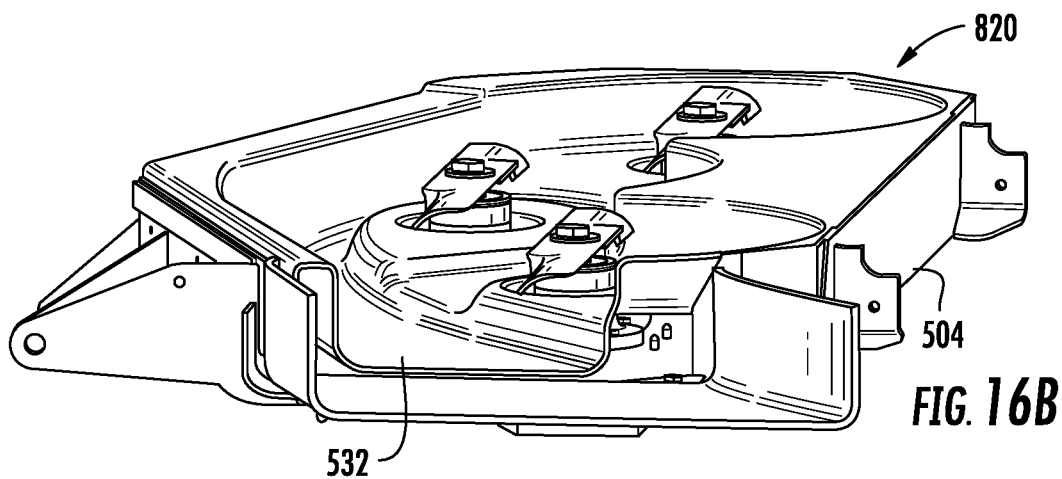
FIG. 16B is another perspective view of the deck insert of FIG. 16A mounted to into the inverted mower deck of FIG. 12.
Figure 16C:
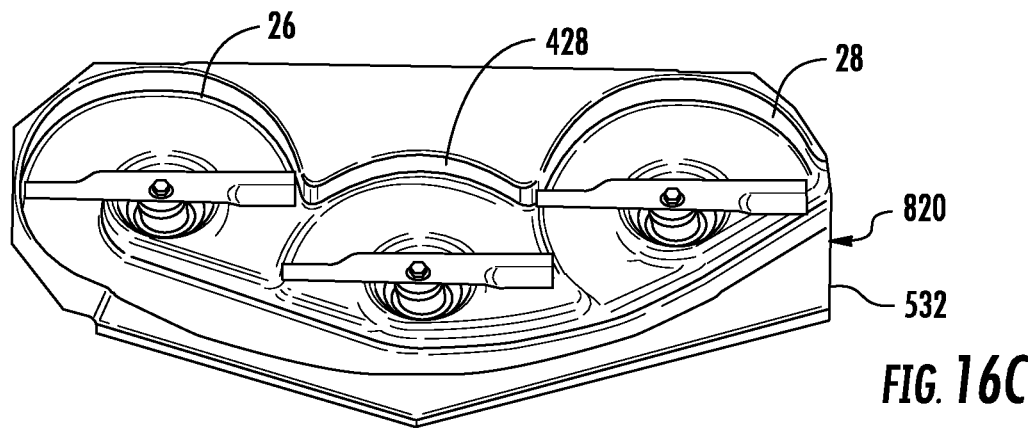
FIG. 16C is a perspective view of the deck insert of FIG. 16A in an inverted orientation.
Figure 16D:
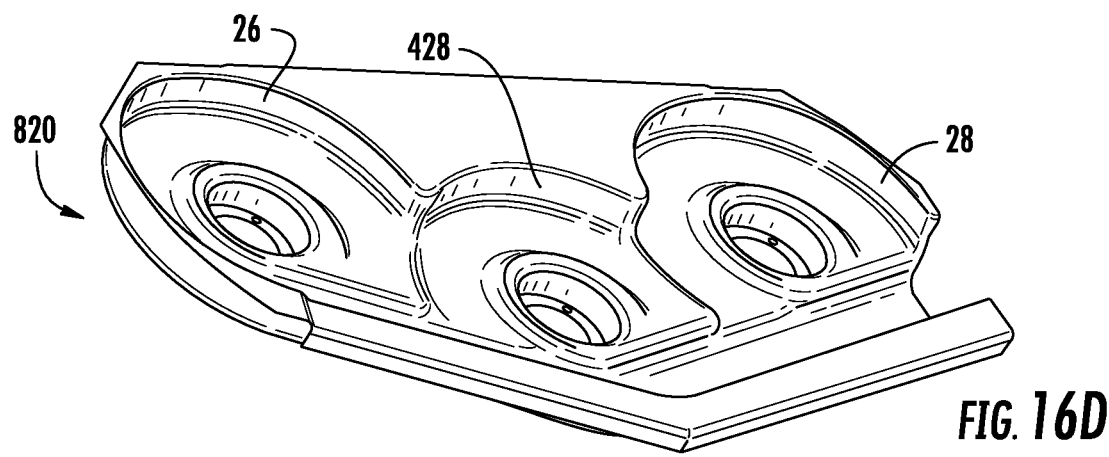
FIG. 16D is another perspective view of the deck insert of FIG. 16A in an inverted orientation.
Figure 16E:
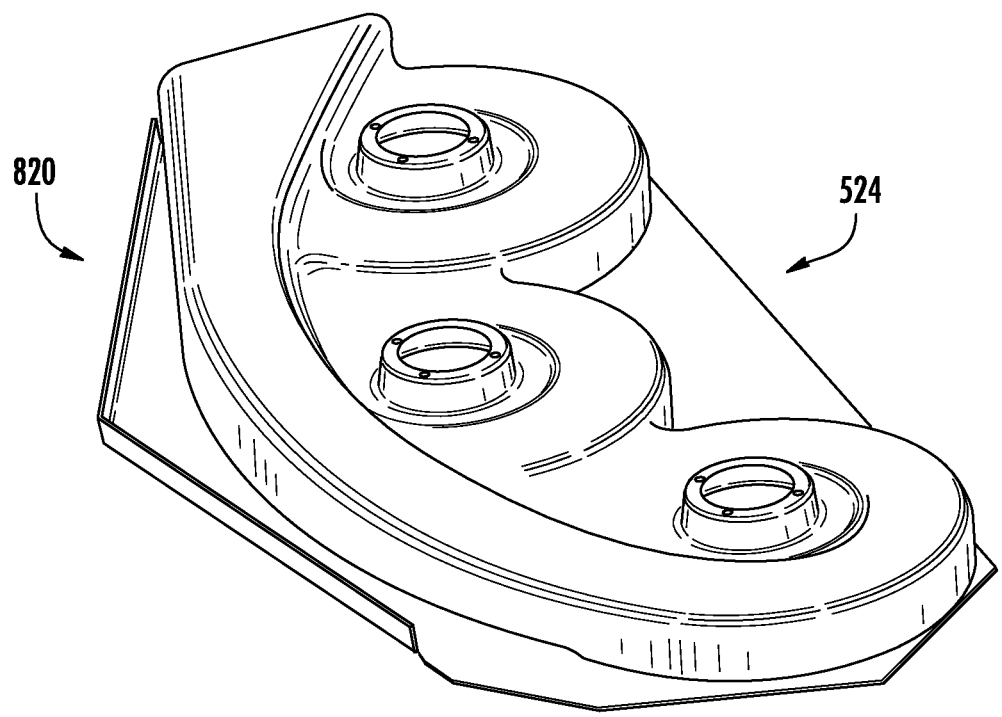
FIG. 16E is a perspective view of the deck insert of FIG. 16A in an upright orientation.

FIGS. 13A-13E illustrate mower deck insert 520, another implementation of mower deck insert 20. FIGS. 13A and 13B illustrate mower deck insert 20 removably or permanently mounted within the mower deck 504. FIG. 13C-13E provide various views of mower deck insert 520. Mower deck insert 520 is similar to Mower deck insert 420 except that intermediate cutting chamber 428 is located forward of cutting chambers 26, 28 and that mower deck insert 520 comprises discharge passage 524 in place of discharge passage 24. As shown by FIG. 12, discharge passage 524 is angled having a first portion or leg 527 extending from end region 58 of scroll 42 and along end region 478 of scroll 462, and a second portion or leg 529 obliquely extending with respect to leg 527 while extending along end portion 78 of scroll 62 to discharge opening 532.

As shown by FIG. 13B which illustrates a deck insert 520 within mower deck 504 from the end of the assembly including discharge opening 516, discharge opening 532 smaller than discharge opening 516 of deck 504, increasing discharge velocity. At the same time, sidewalls 533 of chamber 28 extend partially across opening 516 of deck 504, utilizing the space below deck 504 not utilized by discharge passage 524. As further shown by FIG. 13A, the sidewalls 533 of chambers 26, 28, 428 are each circular or concave, extending along a linear sidewall portion 513, facing away from linear sidewall portion 513. The sidewalls 533 of chamber 428 is spaced further from linear sidewall portion 513 as compared to chambers 26, 28.

As shown by FIG. 13B, deck insert 520 also has an exterior profile, the top surface of deck insert 520 facing the interior surface of deck 504, that is differently shaped and sized than the interior surface of deck 504. As a result, voids 537 are formed between the interior surface of deck 504 and the top or back surface of deck insert 520. In one implementation, such voids 537 remain open. In another implementation, such voids are filled with a filler material, such as the filler material 304 described above.

As shown by FIG. 13C-13E, in the example illustrated, deck insert 520 comprises a single panel formed, such as by vacuum forming or thermoforming, so as to have the illustrated interior profile 540 shown in FIGS. 13E and 13D as well as the exterior profile 542 shown in FIG. 13E. As a result, deck insert 520 has substantially a uniform thickness with the exterior profile 542 substantially mirroring the interior profile 540. In other implementations, deck insert 520 may have varying thicknesses such that exterior profile 542 is different than interior profile 540. In one implementation, exterior profile 542 is configured to match the interior profile of deck 504 while the interior profile 540 is different than both the exterior profile 542 as well the interior profile of deck 504.

FIGS. 14A-14E illustrate deck insert 620, another implementation of deck insert 20. Deck insert 620 similar to deck insert 520 except that deck insert 620 comprises mounting collars 630 through which blade supporting spindles 632 (shown in FIG. 14A) extend. Those remaining components, structure elements of deck insert 620 which correspond to components of deck insert 520 are numbered similarly.

Mounting collars 630 are provided for each of chambers 26, 28 and 428. Each of collars 630 includes one or more opening through which fasteners extend for bolting or otherwise fastening spindles 632 to deck insert 620. In other implementations, mounting collars 630 have other configurations or are omitted.

FIGS. 15A-15E illustrate deck insert 720, another implementation of deck insert 20. Deck insert 720 is similar to deck insert 520 except that deck insert 720 comprises discharge passage 724 instead of discharge passage 524. Discharge passage 724 is itself similar to discharge passage 524 except the discharge passage 724 follows an arcuate centerline having a concave side that faces sidewalls 533 of chambers 26, 28, 428. The curved shape of discharge passage 724 further enhances the flow of grass clippings and other cut material out discharge passage 724 and ultimately out discharge opening 532.

FIGS. 16A-16E illustrate deck insert 820, another implementation of deck insert 20. Deck insert 820 is similar to deck insert 720 except that deck insert 620 comprises mounting collars 630 described above. Those remaining components, structure elements of deck insert 620 which correspond to components of deck insert 520 are numbered similarly. In other implementations, mounting collars 630 have other configurations or are omitted.

Figure 17A:
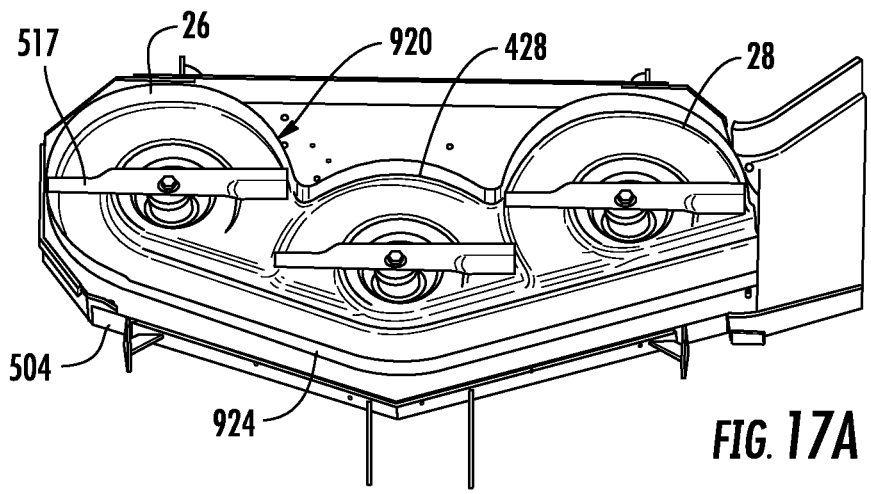
FIG. 17A is a perspective view of an example deck insert mounted to into the mower deck of FIG. 12.
Figure 17B:
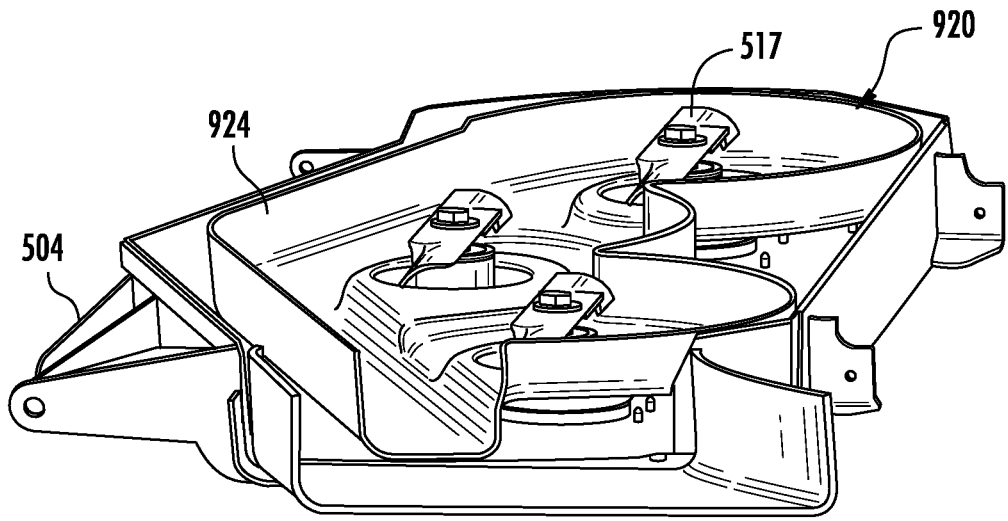
FIG. 17B is another perspective view of the deck insert of FIG. 17A mounted to into the inverted mower deck of FIG. 12.
Figure 17C:
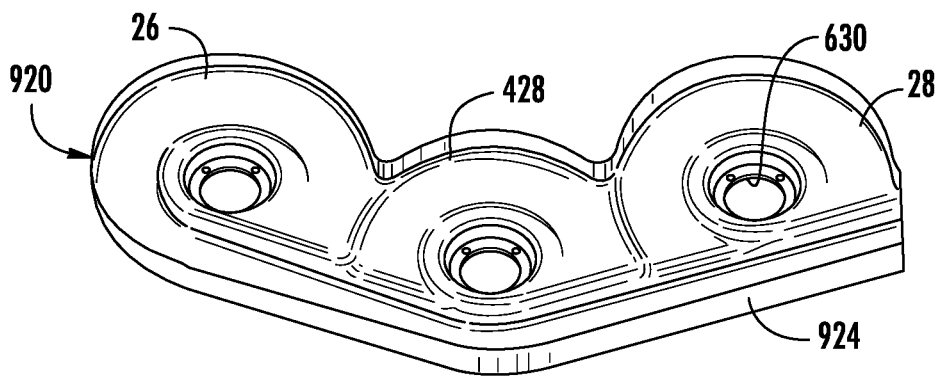
FIG. 17C is a perspective view of the deck insert of FIG. 17A in an inverted orientation.
Figure 17D:
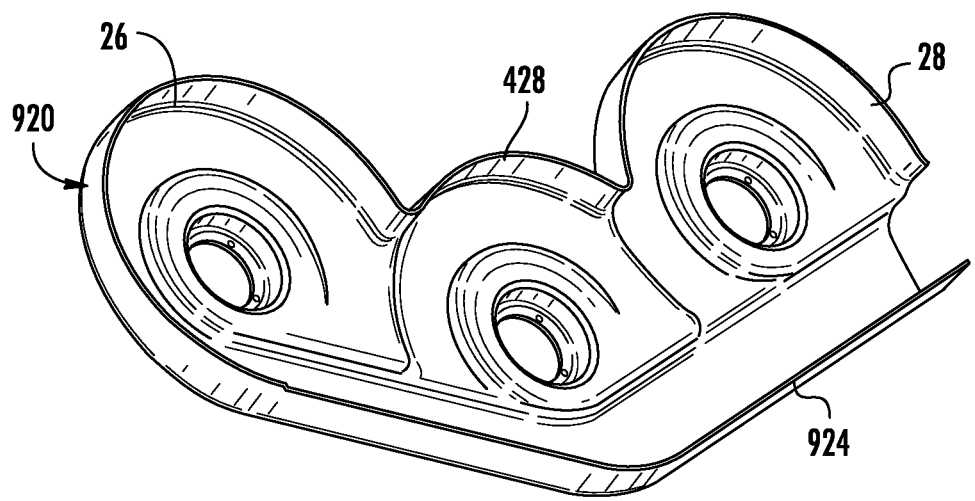
FIG. 17D is another perspective view of the deck insert of FIG. 17A in an inverted orientation.
Figure 17E:
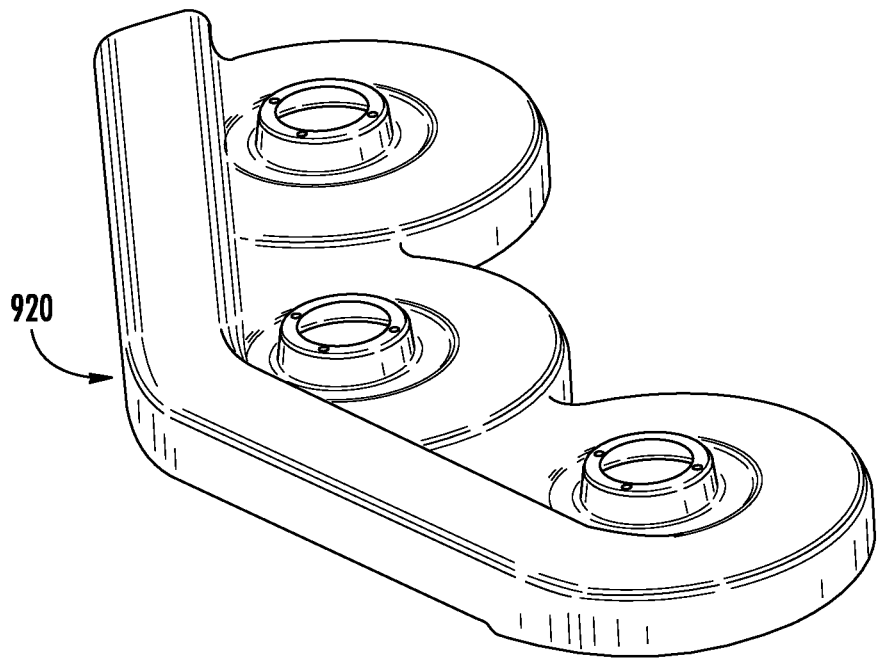
FIG. 17E is a perspective view of the deck insert of FIG. 17A in an upright orientation.

FIGS. 17A-17E illustrate deck insert 920, another example implementation of deck insert 20. Deck insert 920 is similar to deck insert 620 described above except that deck insert 920 comprises discharge passage 924 in lieu of discharge passage 524 and omits interconnecting web 529 (shown in FIG. 13A). Discharge passage 924 is similar to discharge passage 524. As with discharge passage 524, discharge passage 924 comprises legs 527 and 529 described above. As shown by FIG. 17A, those portions of deck insert 920 forming the exterior of discharge passage 924 are internally spaced from sidewalls 514 of deck 504 and those portions of deck insert 924 with sidewalls 533 of chambers 26, 28 and 428 are internally spaced from rear wall 513 of deck 504. As a result, deck insert 920 is lighter in weight and avoids tolerance concerns when deck insert 920 is mounted within the interior of deck 504. Variations in width of discharge passage 924 can be used to tailor discharge velocity of cut material.

Figure 18A:
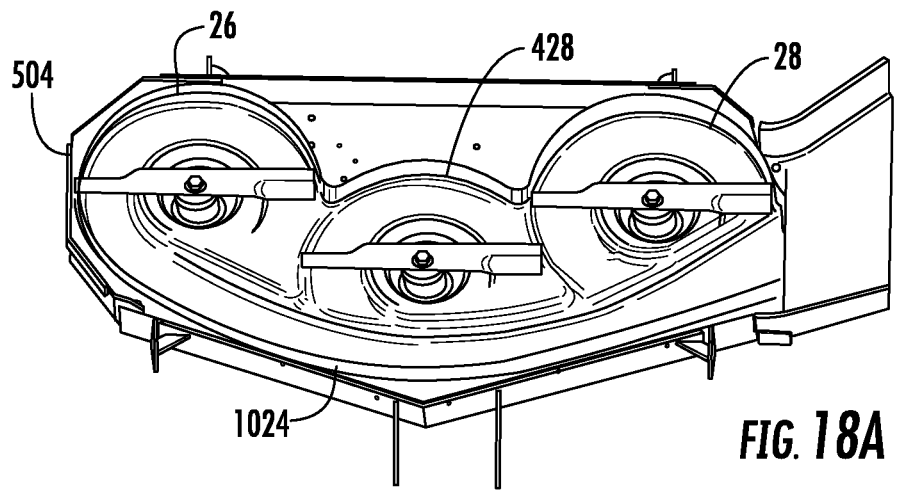
FIG. 18A is a perspective view of an example deck insert mounted to into the mower deck of FIG. 12.
Figure 18B:
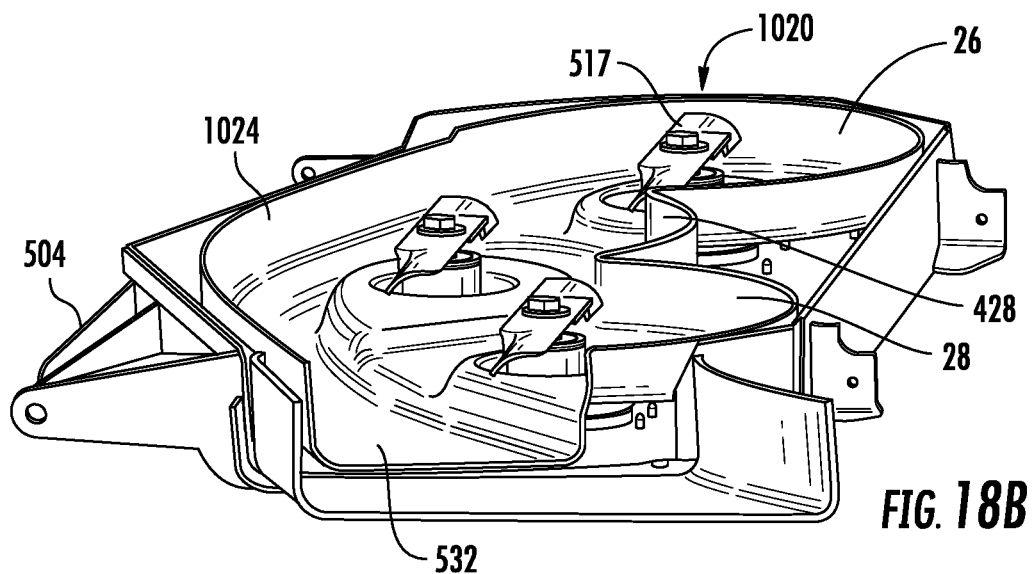
FIG. 18B is another perspective view of the deck insert of FIG. 18A mounted to into the inverted mower deck of FIG. 12.
Figure 18C:
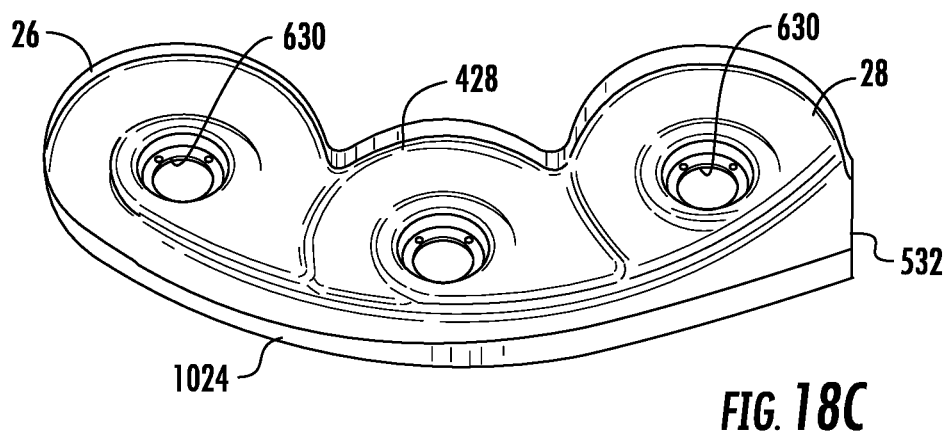
FIG. 18C is a perspective view of the deck insert of FIG. 18A in an inverted orientation.
Figure 18D:
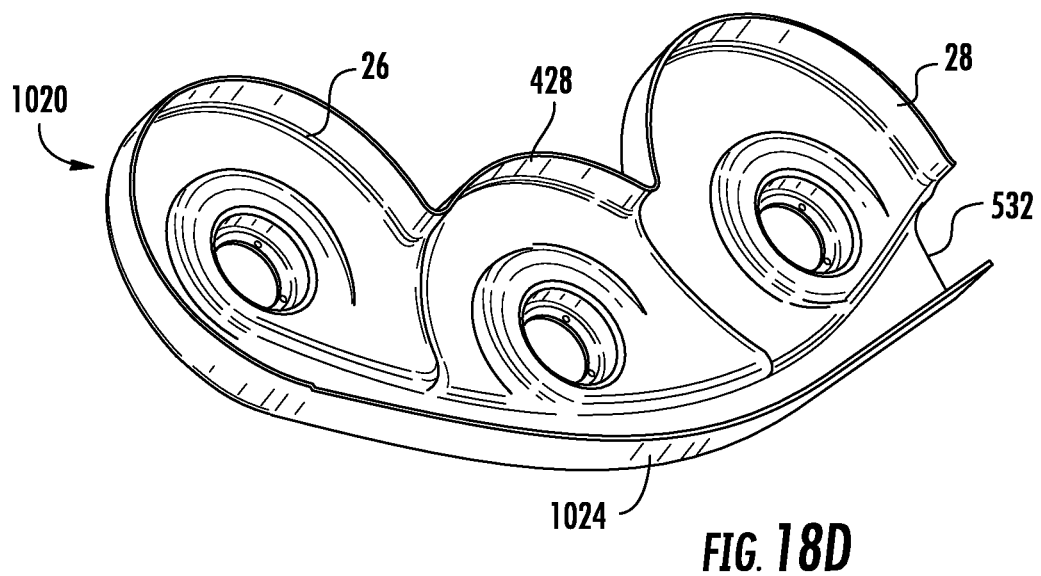
FIG. 18D is another perspective view of the deck insert of FIG. 18A in an inverted orientation.
Figure 18E:
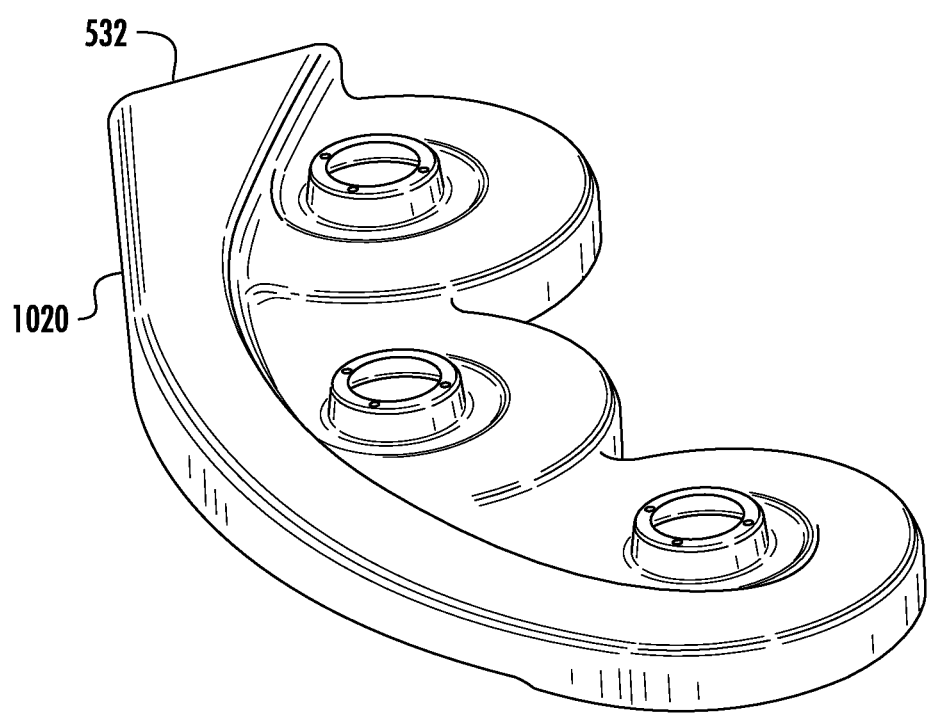
FIG. 18E is a perspective view of the deck insert of FIG. 18A in an upright orientation.

FIGS. 18A-18E illustrate deck insert 1020, another example implementation of deck insert 20. Deck insert 1020 is similar to deck insert 720 described above except that deck insert 1020 comprises discharge passage 1024 in lieu of discharge passage 524 and omits interconnecting web 529 (shown in FIG. 13A). Discharge passage 1024 is similar to discharge passage 724. As with discharge passage 724, discharge passage 1024 extends along an arcuate centerline having a concave side facing chambers 26, 28, 428 and wall 513 of deck 504. As shown by FIG. 18A, those portions of deck insert 1020 forming the exterior of discharge passage 1024 are internally spaced from sidewalls 514 of deck 504 and those portions of deck insert 1024 forming sidewalls 533 of chambers 26, 28 and 428 are internally spaced from rear wall 513 of deck 504. As a result, deck insert 1020 is lighter in weight and avoids tolerance concerns when deck insert 1020 is mounted within the interior of deck 504. Variations in width of discharge passage 924 can be used to tailor discharge velocity of cut material.

Figure 19:
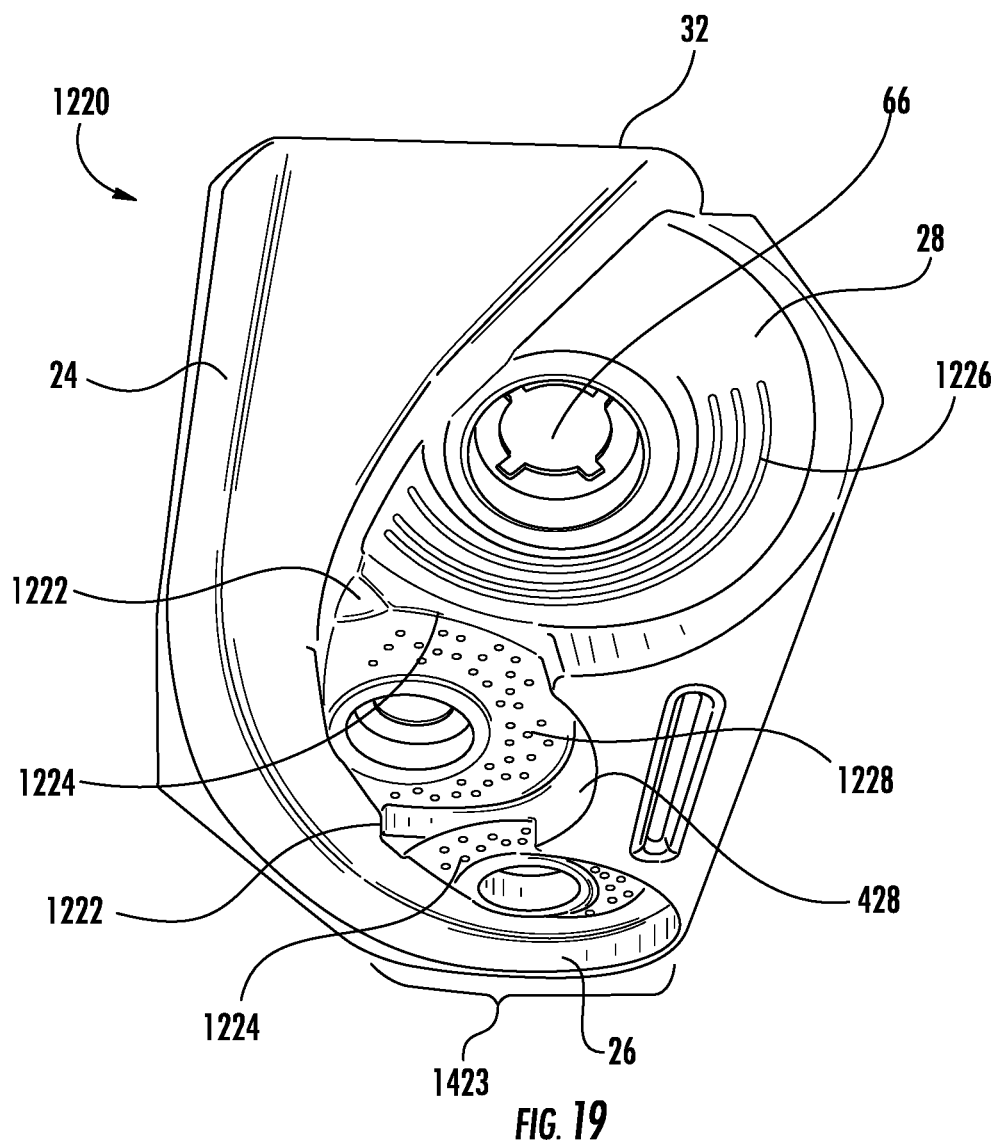
FIG. 19 is a bottom perspective view of another example deck insert.

FIG. 19 is a bottom perspective view illustrating mower deck insert 1220, another example implementation of mower deck insert 420. As with the above described deck inserts, deck insert 1220 is formed from one or more non-metallic materials such as polymers, fiberglass, ceramics, rubbers or the like. Such materials may be in the form of a solid material or layer, a foamed material or layer and/or multiple solid or foamed layers of material laminated to one another. Mower deck insert 1220 is for insertion and mounting to a deck of a mower, within the underside cavity of the deck. In one implementation, mower deck insert 1220 is for mounting within deck 504 shown in FIG. 12. In other implementations, mower deck insert 1220 may be mounted within other decks or may be modified for mounting within other decks.

Mower deck insert 1220 is similar to mower deck insert 420 in that mower deck insert 1220 has an interior profile shape different than the interior profile or shape of the underside cavity of the deck in which insert 1220 is received. Mower deck insert 1220 is similar to mower deck insert 420 except that mower deck insert 1220 additionally comprises divider walls 1222, openings 1224, drag reducing surface treatments 1226 and drag reducing surface treatments 1228. Those remaining structures are components of insert 1220 correspond to similar components of insert 420 and are numbered similarly.

Divider walls 1222 comprise structures extending downward from the upper surface of deck 1220 towards the underlying ground or terrain. Divider walls 1222 extend between consecutive or adjacent chambers 26 and 428 and between adjacent chambers 428 and 28. Divider walls 1222 project downwardly towards the underlying terrain by a greater distance than the upper surface or ceilings of the chambers 26, 28, 428. Divider walls 1222 extend adjacent to discharge passage 24 so as to direct airflow from the adjacent chambers 26, 28, 428 into and along discharge passage 24, rather than across the adjacent chamber 26, 28, 428. As a result, divider walls 1222 promote enhanced flow efficiency or better airflow within each of chambers 26, 28, 428 and along discharge passage 24.

Openings 1224 extend from an adjacent divider wall 1222 between adjacent chambers 26, 28, 428. Openings 1224 facilitate overlapping of the cutting swaths of the blade within the respective chambers. In other implementations, openings 1224 may be omitted such as where chambers 26, 28 and 428 overlap one another in fore and aft directions but do not substantially overlap in a sideways or transverse direction. In such implementations, divider wall 1222 may extend from adjacent discharge passage 24 completely across and between chambers 26, 28, 428.

In the example illustrated, divider walls 1222 comprise triangular shaped, downwardly projecting plateaus. In other implementations, divider walls 1222 may comprise other shapes. In the example illustrated, divider walls 1222 are integrally formed as a single unitary body and homogenously formed as part of deck insert 1220. In other implementations, divider walls 1222 may comprise separate structures fastened, snapped or otherwise mounted to an underside of other portions of deck insert 1220.

Drag reducing surface treatments 1226, 1228 comprise surface irregularities formed upon the underside surface or ceiling of deck insert 1220. Surface treatments 1226, 1228 may reduce airflow drag for enhanced performance of deck insert 1220 during mowing. In the example illustrated, drag reducing surface treatments 1226, 1228 are formed upon an undersurface of deck insert 1220 along the ceilings of each of chambers 26, 28, 428. In yet other implementations, surface treatments 1226, 1228, or other drag reducing surface treatments, may be formed upon other ceiling surfaces of deck insert 1220, such as along the ceiling above the discharge passage. In one implementation, surface treatments 1226, 1228 are sized, shaped or located so as to not diminish or at least not increase a tendency of grass to clump or collect along such surfaces including surface streams 1226, 1228.

Figure 20:
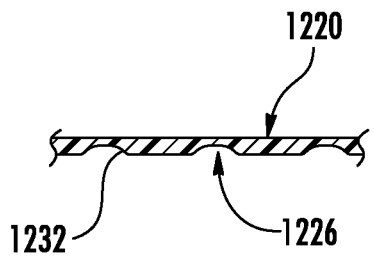
FIG. 20 is a sectional view of a portion of the deck insert of FIG. 19.

As shown by FIGS. 19 and 20, drag reducing surface treatments 1226 comprise serrations or grooves 1232 formed upon an underside or undersurface of chamber 28. Grooves 1232 have centerlines that extend along the direction of anticipated airflow. In the example illustrated, grooves 1232 comprise arcuate or circular grooves extending about axis 66 of chamber 28. In one implementation, each of grooves 1232 has a width of at least 0.125 inches and less than or equal to 0.5 inches, a depth of at least 0.0625 inches and less than or equal to 0.25 inches and a center-to-center pitch of at least 1.5 to 3 times the width of the groove. In other implementations, grooves 1232 may have other configurations. In one implementation, grooves 1232 have a semi-circular cross-sections. In other implementations, grooves 1232 have polygonal cross-section such as square or V-shaped cross-sections.

Figure 21:
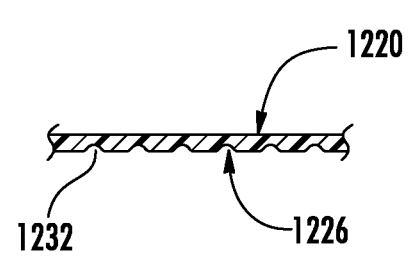
FIG. 21 is a sectional view of another portion of the deck insert of FIG. 19.

As shown by FIGS. 19 and 21, drag reducing surface treatments 1228 comprise craters or dimples 1234 formed upon an underside or undersurface of chamber 26 and chamber 428. In one implementation, dimples 1234 each have a width or diameter of at least 0.125 inches and less than or equal to 0.5 inches, a depth of at least 0.0625 inches and less than or equal to 0.25 inches and a center-to-center pitch of at least 1.5 to 3 times the diameter of the dimple. In one implementation, dimples 1234 are uniformly dispersed along the undersurface of their respective chambers 26, 428. In another implementation, the density of dimples 1234 varies along different portions of the underside of chambers 26, 428 for enhanced drag reduction where such drag reduction is most beneficial.

In one implementation, insert 1220 is formed from a molded polymer. In such an implementation, grooves 1232 and dimples 1234 are formed during molding of insert 1220. In yet other implementations, grooves 1232 and/or dimples 1234 or alternatively formed using material removal processes. Although insert 1220 is illustrated as having both types of drag reducing surface treatments 1226, 1228, in other implementations, insert 1220 may comprise one or the other of surface treatments 1226, 1228. In yet other implementations, insert 1220 may comprise other types of drag reducing surface treatments that breakup airflow to reduce airflow drag along such surfaces.

Figure 22:
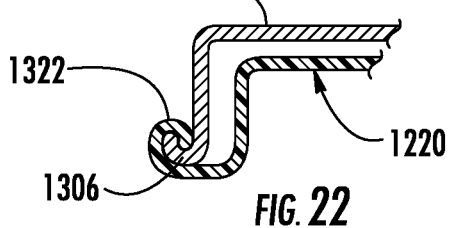
FIG. 22 is a fragmentary sectional view of a portion of the deck insert of FIG. 19 supported within an example deck.

FIG. 22 is a sectional view illustrating an example coupling and interaction of insert 1220 with a deck, such as deck 1304. Deck 1304 are similar to deck 504 (shown in FIG. 12 above) except that deck 1304 is specifically illustrated as additionally a lower lip or edge having a rim 1306. In the example illustrated, rim 1306 forms a hook. In other implementations, rim 1306 forms a horizontal ledge or inclined ledge or lip.

As shown by FIG. 22, insert 1220 comprises a flange 1322 corresponding to rim 1306. Flange 1322 is shaped and sized so as to extend over rim 1306 when insert 1220 is mounted or otherwise secured within the underside cavity of deck 1304. In the example illustrated, flange 1322 forms a hook corresponding to the hook provided by rim 1306. The hooks interact with one another such that insert 1220 wraps about the underside and outside of rim 1306 to protect rim 1306. At the same time, rim 1306 assists in supporting insert 1220. In one implementation, insert 1220 is resiliently flexible so as to temporarily deform and snap onto rim 1306 during insertion of insert 1220 into deck 1304.

In one implementation, an entire outer perimeter of deck 1304 comprises rim 1306 while an entire outer perimeter of insert 1220 comprises flange 1322. In yet other implementations, insert 1220 comprises a plurality of spaced flanges 1322 which interact with corresponding rims 1306 of deck 1304. In one implementation, deck 1304 also comprises a plurality of spaced rim portions 1306 corresponding to the location of the plurality of spaced flanges 1322 when insert 1220 is mounted to an insert within deck 1304.

Figure 23A:
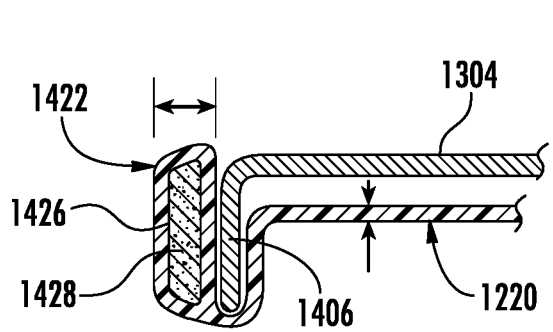
FIG. 23A is a fragmentary sectional view of another portion of the deck insert of FIG. 19 supported within the example deck.

FIG. 23A is a sectional view illustrating an example coupling and interaction of another portion of insert 1220 with a deck, such as deck 1304. As shown by FIG. 23A, insert 1220 is configured so as to wrap around the downwardly projecting wall of deck 1304 such overlap an outer surface 1406 of deck 1304, forming a bumper 1422. In the example illustrated, bumper 1422 extends alongside and parallel to the outer surface of deck 1304. In one implementation, bumper 1422 extends along the outer wall of chamber 26 along the region indicated by reference numeral 1423 in FIG. 19. As a result, bumper 1422 protects overlapped portions of deck 1304 which are rubbed against structures during mowing in order to cut closest to such structures with the blade rotating within chamber 26.

In the example illustrated, bumper 1422 has a thickness T greater than a thickness t of the wall forming insert 1222 within deck 1304. The increased thickness provides enhanced protection. In one implementation, bumper 1422 comprises multiple walls forming a hollow interior 1426. In one implementation, interior 1426 is empty, reducing the weight of insert 1220. In one implementation, portions of the walls extending about interior 1426 are resiliently flexible, allowing such walls to resiliently and temporarily collapse into the void within interior 1426 when encountering another structure. In yet another implementation, interior 1426 is at least partially filled with a resiliently compressible material 1428, such as an open celled or close celled foam. In still other implementations, bumper 1422 may be formed from a single wall of polymeric material having substantially the same thickness is that of the remainder of insert 1220.

Figure 23B:
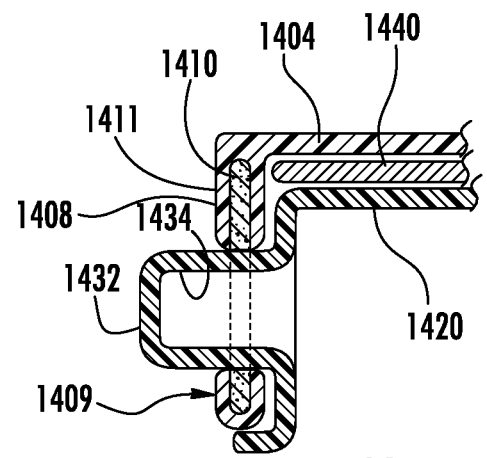
FIG. 23B is a fragmentary sectional view of another example deck insert within another example deck.

FIG. 23B is a fragmentary sectional view illustrating deck 1404 and deck insert 1420, another implementation of deck insert 1220. Deck 1404 is similar to deck 1304 and deck 504 described above except that deck 1404 comprises at least one opening 1408 extending through the downwardly extending portion 1409 of deck 1404. In the example illustrated, deck 1404 is formed from one or more layers of non-metallic materials such as one or more layers of a polymer, ceramic, fiberglass or composites thereof In one implementation, portions of the non-metallic layers of material forming deck 1404 encapsulate or in case metal inserts, such as metal insert 1410. In other implementations, inserts 1410 may be omitted or deck 1404 may be formed from a metal material.

As further illustrated by FIG. 23B, in implementations where deck 1404 has a non-metallic body, being formed from one or more layers of a non-metallic material and where deck insert 1420 also has a non-metallic body, formed from one or more layers of a non-metallic material, the mower may additionally comprise a rigid metal backbone member 1440 extending between and sandwiched between portions of deck 1404 and insert 1420. Backbone member 1440 contacts both deck 1404 and insert 1420 while rigidifying and strengthening their respective structures and shapes. In other implementations, backbone member 1440 is omitted.

Deck insert 1420 is similar to deck insert 1220 described above except that deck insert 1420 additionally comprises for bumper portion 1432. Bumper portion 1432 projects, juts or extends through opening 1408 and beyond opening 1408 horizontally outwardly beyond the outer surface 1411 of downward extending portion 1409 of deck 1404. In one implementation, bumper portion 1432 projects outwardly beyond outer surface 1411 by at least 0.5 inches and nominally at least 2 inches. In other implementations, bumper portion 1432 extends outwardly beyond surface 1411 by other extends.

In the example illustrated, bumper portion 1432 is hollow, having a hollow interior 1434 in communication with the interior of insert 1420. In another implementation, the hollow interior 1434 is filled with a gel, foam or other filler material having a greater degree of compressibility or lower density than that of the material forming the walls of insert 1420. In another implementation, hollow interior 1434 may be omitted and replaced with a honeycomb structure formed from the same material forming insert 1420. In yet other implementations, bumper portion 1432 is solid.

Figure 24A:
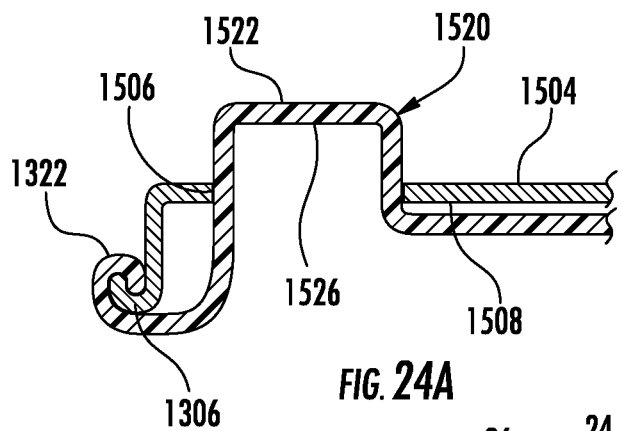
FIG. 24A is a fragmentary sectional view of another example deck insert supported within another example deck.

FIG. 24A is a sectional view illustrating deck 1504 and insert 1520, example implementations of deck 1304 and 420 described above. Deck 1504 is similar to deck 1304 and deck 402 except that deck 1504 comprises an opening 1506 extending through deck ceiling 1508. Opening 1520 received portions of insert 1520.

Figure 24B:
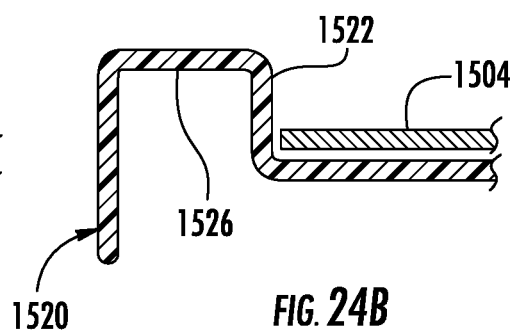
FIG. 24B is a fragmentary sectional view of another portion of the deck insert of FIG. 24A.

Insert 1520 is similar to insert 1220 except that insert 1520 additionally comprises protuberant portion 1522. Protuberant portion 1522 comprises those portions of insert 1520 that stick out, project or jut upwardly beyond a lower surface of deck 1504 and nominally above the upper surface of deck 1504. In one implementation, protuberant portion 1522 is prominent with respect to and juts through and above opening 1506. As shown by FIG. 24B, in another implementation, insert 1520 extends horizontally beyond a perimeter of deck 1504 then project upwardly above the top of deck 1504 to form protuberant portion 1522 and ceiling 1526.

Protuberant portions 1522 are integrally formed as a single unitary body and homogenous with portions of insert 1520 that extend below deck 1504 and which form at least portions of the interior profile provided by deck 1520. In one implementation, protuberant portion 1522 are integrally formed as a single unitary body as part of a single layer that forms both protuberant portion 1520 and the ceiling of at least one of chambers 26, 28 and 428 (shown in FIG. 19). In the example illustrated, protuberant portion 1522 is formed as part of a continuous layer that forms a ceiling of discharge passage 24 and each of the chambers provided by the particular insert, such as insert 1520, wherein portions of the layer projects through opening 1506.

Protuberant portion 1522 has an underside which forms a ceiling 1526 that forms part of the interior profile provided by insert 1520. Ceiling 1526 extends at or above and beyond a top surface of deck 1504. Because protuberant portion 1522 juts or projects above and beyond the top of deck 1504, the height of ceiling 1526 is not restricted to the vertical distance between the underlying terrain and the underside of deck 1504. As a result, ceiling 1526 may have a greater height, providing a greater volume below ceiling 1526.

In one implementation, ceiling 1526 of protuberant portion 1522 serves as the ceiling for passage 24. As a result, those portions of passage 24 provided with ceiling 1526 have a greater cross-sectional area or volume to provide greater space for grass movement and airflow. In one implementation, ceiling 1526 of protuberant portion 1522 is located in the region of passage 24 identified by reference 1423 in FIG. 19, alongside chamber 26.

In other implementations, protuberant portion 1522 and its ceiling 1526 may be provided at other portions of insert 1520. For example, protuberant portion 1522 may additionally or alternatively form part of the ceiling or underside of one or more of channels 26, 28 and 428. In one implementation, deck 1504 merely comprises a framework or skeleton, wherein at least a majority and nominally two thirds of the horizontal surface area of deck 1504 is open and wherein the underlying insert 1520 projects through, above and beyond such open areas or regions of deck 1504.

Figure 24C:
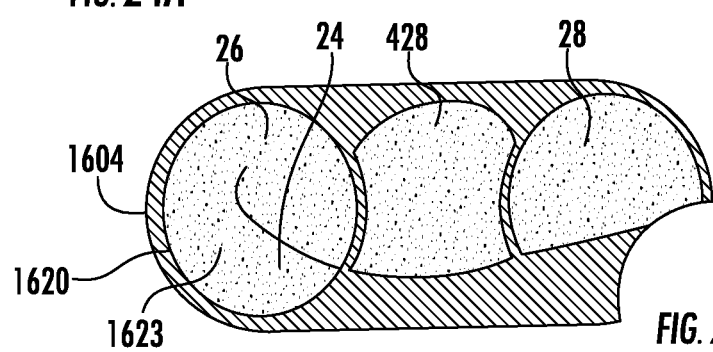
FIG. 24C is a top view of an example deck serving as a skeleton for supporting another example underlying deck insert.

FIG. 24C is a top view of an example deck 1604 and the underlying insert 1620. In the example illustrated, those portions of insert 1620 forming each of chambers 26, 428 and 28 as well as the far side portion 1623 of passage 24 jut above the upper surface of deck 1604 which serves as a skeleton or supporting framework for insert 1620. In other implementations, insert 1620 may project above deck 1604 to other extents, wherein the skeletal configuration of deck 1604 may vary depending upon the extent to which insert 1620 projects above deck 1604.

Figure 25:
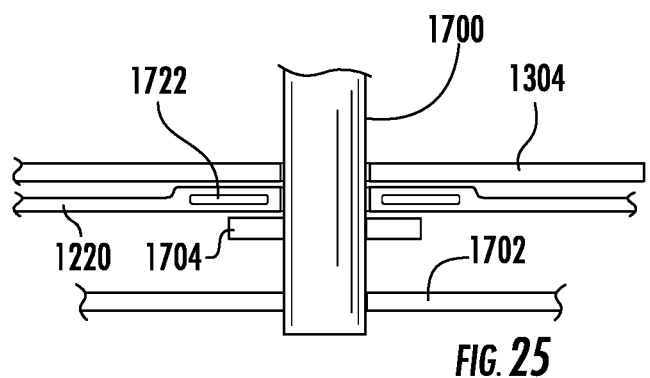
FIG. 25 is a fragmentary sectional view illustrating one example arrangement supporting an example deck insert.

FIG. 25 is a sectional view illustrating one example arrangement for the support of a deck insert, such as deck insert 1220 or 1520. As shown by FIG. 25, the mower additionally comprises a spindle 1700 which supports cutting blade 1702 and a retainer 1704. In one implementation, retainer 1704 comprises a washer, ring or other structure secured to spindle 1704. Insert 1220 extends about spindle 1700 and is captured or sandwiched between deck 1304 and retainer 1704. In one implementation, deck 1304 additionally comprises a strengthening ring or other structure opposite to retainer 1704 and about spindle 1700.

As further shown by FIG. 25, in one implementation, insert 1220, one formed from a molded polymer, encapsulates rigid or strengthening inserts 1722. In one implementation insert 1722 comprise metal inserts. Such metal inserts provide additional strength and rigidity in selected regions of insert 1220. In the example illustrated, inserts 1722 are encapsulated within deck insert 1220 in regions about the opening through which spindle 1700 extends, the regions of insert 1220 which are captured between retainer 1704 and deck 1304. In other implementations, inserts 1722 are fastened, bonded or otherwise secured to deck insert 1220 in other fashions other than through encapsulation. In other implementations, inserts 1722 are provided at additional or alternative locations of deck insert 1220. In yet other implementations, insert 1722 are omitted.

FIG. 26 is a bottom perspective view of an example deck 1804. Deck 1804 is similar to deck 4 described above except that deck 1804 lacks complex surface geometries, having the form of an oval basin or pan. In one implementation, deck 1804 is formed from a stamped and deformed metal. In another implementation, deck 1804 is fabricated from sheet metal or plate steel. As shown by FIG. 26, deck 1804 comprises top 1806, sidewalls 1808, blade drive openings 1810, side discharge opening 1812 and bagging opening 1814. Blade Drive openings 1810 comprise openings through which shafts or spindles associated with the blades to be received within deck 1804 extend. Side discharge opening 1812 comprises an opening at one end of deck 1804 through which clippings are to be discharged to one side of the mower. Bagging opening 1814 comprises an opening through which grass clippings are to be directed to a bag or other clipping collection volume or container. Because deck 1804 includes both side discharge opening 1812 and bagging opening 1814, deck 1804 may be adapted for side discharge of clippings, bagging of clippings or mulching of clippings through the use of different interchangeable deck inserts.

In one implementation, the mower including deck 1804 is provided with insert 22 (shown and described above with respect to FIGS. 1-4). In such an implementation, the mower is equipped for side discharge of clippings. In such an implementation, deck insert 22 extends across, includes and covers bagging opening 1814 of riding discharge passage 24 that leads to side discharge opening 1812.

FIGS. 27 and 28 illustrate deck insert 1920, a deck insert interchangeable with deck insert 22. Deck insert 1922 is specifically configured to cooperate with deck 1804 to facilitate rear bagging of clippings. Deck insert 1922 is similar to deck insert 22 described above except that deck insert 1920 omits discharge passage 24 and opening 32 while additionally comprising bagging opening 1922 and chute 1924. Bagging opening 1922 comprises opening through the ceiling of deck insert 1920 that is in substantial alignment with bagging opening 1814 of deck 1804 when insert 1920 is mounted to an received within the underside cavity of deck 1804. Bagging opening 1922 is located between chambers 26 and 28.

Chute 1924 comprises a conduit which extends from bagging opening 1922 through bagging opening 1814 to a clippings containment structure, such as a bag. In one implementation, chute 1924 is integrally formed as a single unitary body with the remainder of deck insert 1920 that is contained below deck 1804. In another implementation, chute 1924 is releasably mounted to the remainder of deck insert 1920. In some implementations, chute 1924 is pre-existing as part of the bagging mechanism of the mower, wherein the chute 1924 simply abuts a top of the wall of deck insert 22 when the mower is in a side discharge mode and is not being presently used for bagging of clippings.

FIG. 29 is a top view of deck insert 2020. Deck insert 2020 is similar to deck insert 20 except that deck insert 2020 is specifically configured for mulching. Deck insert 2020 omits discharge passage 24 and discharge opening 32. In contrast, deck insert 2020 comprises a continuous layer of material, such as a nonmetal such as a polymer, fiberglass, ceramic or the like, that forms a pair of chambers 26, 28 in which the cutting blades are rotatably driven to cut grass which is mulched into the underlying uncut grass. The continuous layer of material further comprises a mulching blockage portion 2021, in the form of a wall, plug or the like, that extends across and blocks discharge opening 1812 of deck 1804. In some implementations, deck insert 2020 may be used with other decks similar to deck 1804, but wherein such alternative decks 1804 omit one of openings 1812, 1814.

FIG. 30 is a sectional view illustrating a portion of deck insert 2020 as shown by FIG. 30, the underside of deck insert 2020 comprises kickers, down wings or deflectors 2022 integrally formed as a single unitary body as part of the wall forming insert 2020. Deflectors 2022 extend along the ceiling of each of chambers 26, 28. As indicated by arrows 2025, deflectors 2022 direct airflow downward across cutting blade 2027 towards the underlying ground or terrain 2029. As a result, grass or clippings is also directed back into the ground 2029 for mulching. In other implementations, deck insert 2020 may omit deflectors 2022.

FIGS. 31-35 illustrate mower deck insert system 2100. Mower deck insert system 2100 comprises one or more modules that form a deck insert for a deck. Mower deck insert 2100 comprises a single mower insert module that may be used in a single chamber, single cutting blade mower or that may be combined with other identical modules in multi chambered, multi-cutting blade mowers. FIG. 31 is a bottom perspective view of an example mower deck insert module 2120. Insert module 2120 is to be mounted to the underside of deck using mechanical attachment with fasteners, such as screws, bolts, clips, "Christmas trees" and the like, or various fittings. In another implementation, mower deck insert module 2120 is configured to be mounted to the underside of mower deck 4 using a multitude of bonding processes including adhesives and coatings. In yet another implementation, mower deck insert module 2120 is configured to be mounted to the underside of mower deck 4 through welding, latches or other securement mechanism.

In one implementation, mower deck insert module 2120 is formed from one or more polymeric materials or plastics, providing mower deck insert module 2120 with flexibility and enabling mower deck insert mother 2120 to bend or flex to fit to an existing mower deck without substantially increasing the weight of the cutting unit of the mower. Polymeric forming processes for the mower deck insert module 2120 could include thermoforming, injection molding, blow molding, rotational molding, and polystyrene foam (or alternative functional equivalent material) coated with a polymeric material. In other implementations, mower deck insert module 2120 is formed from fiberglass or a stamped metal, such as steel or aluminum. A stamped metal deck insert may be coated or treated with a chemical compound (such as boron nitride) to provide wear resistance and/or reduced friction/anti-stick properties. In yet other implementations, mower deck insert module 2120 is formed from a foam material or an alternative functional equivalent material (such as wood), wherein at least the underside of the material is coated with a wear resistant coating and/or a low friction/anti-stick coating, such as polytetrafluoroethylene (TEFLON), boron nitride, or polyurea/polyurethane. In addition to providing wear resistance and/or low friction, the coating may also be used to bond the mower deck insert module 2120 to the mower deck.

In some implementations, deck insert module 2120 may be employed permanently to the mower deck. In some implementations, deck insert mother 2120 is removably mountable to mower deck, facilitating easy replacement of deck insert module 2120 when deck insert mother 2120 becomes worn or damaged or when a different interior profile is preferred to optimize performance for a specific application need, such as side-discharging, bagging, mulching, or atypical mowing conditions. Differently configured cutting blades can be used with different interior profiles to provide optimal airflow and/or reduced noise characteristics and/or reduced power consumption characteristics, for a specific application need. A reduced power consumption characteristic is especially desirable if the blade drive system is a battery-powered electric motor. Because deck insert model 2120 extends on the inside of a deck, deck insert module 2120 protects the deck which now serves as a backing, substrate or base structure. In some implementations, sound insulating material can be used between deck insert 2120 and the deck. Deck insert module 2120 being of favorable shape for enhanced airflow with less drag and turbulence, reduces unwanted grass buildup on the underside of the mower deck, usually experienced when cutting wet grass. This effect can be enhanced via use of reduced friction/anti-stick coatings in combination with the favorable deck insert model 2120 shape. Deck insert module 2120 being of favorable shape for enhanced airflow and vacuum generation reduces or eliminates blow-out from underneath the deck lip, thus improving cut-quality of the mowing unit.

In the example illustrated, mower deck insert module 2120 comprises a panel or body 2122 having a perimeter including a linear side portion or vertical wall that forms side of the discharge passage and a curved side portion extending from the linear side portion. Body 2122 further comprises a hub 2140 and axial scroll 2142. Hub 2140 comprises a portion of body 2122 centrally located to provide a blade mounting portion 2144 for rotatably supporting a cutting blade. In the example illustrated, blade mounting portion 2144 comprises an aperture extending through hub 2140 of body 2122 through which a blade shaft or blade bearing assembly extends.

Axial scroll 2142 comprises a surface 2150 helically extending about axis 2146 and above the linear and curved side portions forming the perimeter of body 2122. Axial scroll 2142 forms a ceiling 2150 above the cutting chamber. As shown by FIG. 31, in the example illustrated, deck insert model 2120 omits sidewalls about scroll 2142, instead utilizing sidewalls provided by the overlying deck are deck shell and facilitating use of module 2142 with other modules 2142. As shown by FIG. 31, deck insert module 2120 omits a discharge passage, instead utilizing portions of the overlying deck or shell to provide the discharge passage, facilitating use of module 2142 with other modules 2142.

In the example illustrated, axial scroll 2142 axially scrolls about axis 2146 such that scroll 2142 is shallowest and such that upper surface 2150 is vertically lowest at start region 2156 of scroll 2142 and such that scroll 2142 is the deepest and vertically highest at end region 2158, the junction between scroll 2142 and discharge passage formulation part by the overlying deck or shell. In the example illustrated, upper surface 2150 smoothly blends with or ramps into the ceiling of discharge passage 24 at end region 2158. In other implementations, the junction between upper surface 2150 at region 2158 and the discharge passage may have a distinctive ramp or step.

In the example illustrated, scroll 2142 extends at least 180° and nominally 240° about axis 2146. Upper surface 2150 of scroll 2142 has scroll height change of less than 2 inches from start region 2156 to end region 2158. With such an example, a sufficiently large amount of airflow is produced to move grass clippings and other cut material while at the same time maintaining a low profile for the deck insert model 2120, allowing deck insert model 2120 to better fit beneath a mower chassis. In other implementations, scroll 2142 may scroll about axis 2146 by other extents and have a different scrolling rate with a different height change.

FIG. 32 illustrates deck insert module 2120 mounted within a single chambered or single cutting blade shell or deck 2204 to form deck assembly 2205. Mower deck 2204 comprises a deck for being mounted beneath a chassis of a tractor unit so as to enclose a single rotating cutting blade. Mower deck 2204 has an underside cavity 2206 with an interior profile 2208. In the example illustrated, mower deck 2204 comprises a ceiling 2210 and sidewalls 2212 that form a single cutting chamber 2214, a discharge passage 2215 extending alongside cutting chamber 2214 and a discharge opening 2216 through which cut grass is discharged from chamber 2214.

FIG. 33 illustrates two deck insert modules 2120 mounted within a two chambered or dual cutting blade shell or deck 2304 to form deck assembly 2305. In the example illustrated, modules 2120 are illustrated as being mounted side-by-side. In the example illustrated, model 2120 are mounted within deck 2304 such that region 2156 of the far side module 2120 (farthest from the discharge opening 2316) is adjacent region 2158 of the near side module 2120 (closest to discharge opening 2316) In other implementations, modules 2120 may be spaced from one another. In some implementations, portions of deck 2304 extend between modules 2120 to completely separate modules 2120.

Mower deck 2304 comprises a deck for being mounted beneath a chassis of a tractor unit so as to enclose a single rotating cutting blade. Mower deck 2304 has an underside cavity 2306 with an interior profile 2308. In the example illustrated, mower deck 2304 comprises a ceiling 2310, outer sidewalls 2311 and inner sidewalls 2312 that form two cutting chambers 2314, a discharge passage 2315 extending alongside cutting chambers 2314 and a discharge opening 2316 through which cut grass is discharged from chambers 2314. Outer sidewalls 2311 form a perimeter of deck 2304 and define portions of discharge passage 2315. Inner sidewalls 2312 circumferentially extend about sides of inserts 2120 and define the partial circumferential outer profile of each of cutting chambers 2314. In some implementations, those portions of outer sidewalls 2311 outside of inner sidewalls 2312 may be omitted. In other implementations, deck 2304 may have other configurations.

FIGS. 34 and 35 illustrate three deck insert modules 2120 (modules 2120A, 2120B, 2120C) mounted within a three chambered or triple cutting blade shell or deck 2404 to form deck assembly 2405. In the example illustrated, modules 2120 are illustrated as being mounted side-by-side. In the example illustrated, modules 2120 are mounted within deck 2404 such that region 2156 of the far side module 2120A (farthest from the discharge opening 2416) is adjacent region 2158 of central module 2120B while region 2156 of module 2120B is adjacent region 2158 of near side module 2120C (closest to discharge opening 2416). In other implementations, modules 2120 may be spaced from one another. In some implementations, portions of deck 2404 extend between modules 2120 to completely separate modules 2120.

Mower deck 2404 comprises a deck for being mounted beneath a chassis of a tractor unit so as to enclose a single rotating cutting blade. Mower deck 2404 has an underside cavity 2406 with an interior profile 2408. In the example illustrated, mower deck 2404 comprises a ceiling 2410, outer sidewalls 2411 and inner sidewalls 2412 that form three cutting chambers 2414, a discharge passage 2415 extending alongside cutting chambers 2414 and a discharge opening 2416 through which cut grass is discharged from chambers 2414. Outer sidewalls 2411 form a perimeter of deck 2304. Inner sidewalls 2412 circumferentially extend about sides of inserts 2120 and define the partial circumferential outer profile of each of cutting chambers 2314. In the example illustrated come inner sidewalls 2412 additionally extend alongside discharge passage 2415 two formed sides of discharge passage 2415. In some implementations, those portions of outer sidewalls 2411 outside of inner sidewalls 2312 may be omitted. In other implementations, deck 2404 may have other configurations.

Although the claims of the present disclosure are generally directed to a more, the present disclosure is additionally directed to the features set forth in the following definitions.

While the preferred embodiments of the invention have been illustrated and described, it will be appreciated that various changes can be made therein without departing from the spirit and scope of the invention. For example, although different example embodiments may have been described as including one or more features providing one or more benefits, it is contemplated that the described features may be interchanged with one another or alternatively be combined with one another in the described example embodiments or in other alternative embodiments. One of skill in the art will understand that the invention may also be practiced without many of the details described above. Accordingly, it will be intended to include all such alternatives, modifications and variations set forth within the spirit and scope of the appended claims. Further, some well-known structures or functions may not be shown or described in detail because such structures or functions would be known to one skilled in the art. Unless a term is specifically and overtly defined in this specification, the terminology used in the present specification is intended to be interpreted in its broadest reasonable manner, even though it may be used in conjunction with the description of certain specific embodiments of the present invention.

What is claimed is:

1. A mower deck insert comprising:
   a sidewall;
   a ceiling;
   a cavity defined by the ceiling and the sidewall;
   an first interior profile defined by the ceiling and the sidewall;
   a mower deck insert within the cavity and comprising:
      a first cutting chamber comprising a first axial scroll helically extending about a first vertical axis, the first axial scroll comprising a first upper surface having a first start region and a first end region;
      a second cutting chamber comprising a second axial scroll helically extending about a second vertical axis, the second axial scroll comprising a second upper surface having a second start region and a second end region;
      a discharge passage extending adjacent to the first cutting chamber and the second cutting chamber; and
      a second interior profile defined by the first cutting chamber, the second cutting chamber, and the discharge passage; and
   a gap between the mower deck and the mower deck insert;
   wherein the second interior profile is different than the first interior profile;
   wherein the first start region is vertically lower than the first end region, and
   wherein the second start region is vertically lower than the second end region.

2. The mower deck of claim 1, wherein the second end region is vertically lower than the first end region.

3. The mower deck of claim 2, wherein the first end region fluidly couples the first cutting chamber to the discharge passage.

4. The mower deck of claim 3, wherein the second end region fluidly couples the second cutting chamber to the discharge passage.

5. The mower deck of claim 4, wherein the first axial scroll helically extends at least 180° about the first vertical axis and wherein the second axial scroll helically extends at least 180° about the second vertical axis.

6. The mower deck of claim 1, wherein the first start region is vertically lower than the first end region by less than 2 inches.

7. The mower deck of claim 6, wherein the second start region is vertically lower than the second end region by less than 2 inches.

8. The mower deck of claim 1, further comprising a discharge opening fluidly coupled to the discharge passage.

9. The mower deck of claim 8, the mower deck insert further comprising a third cutting chamber comprising a third axial scroll helically extending about a third vertical axis, the third axial scroll comprising a third upper surface having a third start region and a third end region; wherein the third cutting chamber is located between the first cutting chamber and the second cutting chamber; and wherein the second interior profile is defined by the third cutting chamber.

10. The mower deck of claim 9, the mower deck insert further comprising a first divider wall and a second divider wall, the first divider wall located between the first cutting chamber and the third cutting chamber, and the second divider wall located between the third cutting chamber and the second cutting chamber.

11. A mower comprising:
    at least one cutting blade operable to rotate about a vertical axis;
    a mower deck comprising a first interior profile;
    a mower deck insert coupled to the mower deck, the mower deck insert comprising:
       at least one cutting chamber comprising an axial scroll helically extending about the vertical axis, the axial scroll comprising an upper surface having a start region and an end region; and
       a second interior profile defined by the at least one cutting chamber; and
    a gap between the mower deck and the mower deck insert;
    wherein the start region is vertically lower than the end region; and
    wherein the second interior profile is different than the first interior profile.

12. The mower of claim 11, wherein the at least one cutting chamber further comprises a blade mounting portion and wherein a portion of the at least one cutting blade extends through the blade mounting portion.

13. The mower of claim 12, wherein the at least one cutting blade comprises:
    a central portion;
    one or more cutting edges; and
    one or more reduced size lift wings.

14. The mower of claim 13, wherein the mower deck insert further comprises a discharge passage fluidly coupled to the at least one cutting chamber and a discharge opening fluidly coupled to the discharge passage to discharge airflow externally from the mower deck insert.

15. The mower of claim 14, wherein, during operation of the at least one cutting blade, the discharge opening outputs airflow of at least 600 cubic feet per minute at standard conditions.

16. A mower comprising:
    a mower deck comprising a first interior profile;
    a first cutting blade operable to rotate about a first vertical axis;
    a second cutting blade operable to rotate about a second vertical axis;
    a mower deck insert coupled to the mower deck, the mower deck insert comprising:
       a first cutting chamber comprising a first axial scroll helically extending about the first vertical axis, the first axial scroll comprising a first upper surface having a first start region and a first end region;

a second cutting chamber comprising a second axial scroll helically extending about the second vertical axis, the second axial scroll comprising a second upper surface having a second start region and a second end region; and a second interior profile defined by the first cutting chamber and the second cutting chamber; and a gap between the mower deck and the mower deck insert;

wherein the first end region is approximately 240° about the first vertical axis from the first start region; and wherein the second interior profile is different than the first interior profile.

17. The mower of claim 16, wherein the second end region is vertically lower than the first end region.

18. The mower of claim 16, wherein the mower deck insert further comprises a discharge passage extending adjacent to the first cutting chamber and the second cutting chamber.

19. The mower of claim 18, wherein the first end region fluidly couples the first cutting chamber to the discharge passage and wherein the second end region fluidly couples the second cutting chamber to the discharge passage.

20. The mower of claim 19, wherein during operation the first cutting blade and the second cutting blade output airflow at a sound power of less than or equal to 104 decibels.

* * * * *